United States Patent
Mattias et al.

(10) Patent No.: US 8,770,960 B2
(45) Date of Patent: Jul. 8, 2014

(54) MOVING HEAD DOUGH PRESS

(75) Inventors: Scott Mattias, Tustin, CA (US); John Colwell, Fullerton, CA (US)

(73) Assignee: J.C. Ford Company, La Habra, CA (US)

( * ) Notice: Subject to any disclaimer, the term of this patent is extended or adjusted under 35 U.S.C. 154(b) by 0 days.

(21) Appl. No.: 11/968,593

(22) Filed: Jan. 2, 2008

(65) Prior Publication Data

US 2008/0102152 A1    May 1, 2008

Related U.S. Application Data

(63) Continuation of application No. 11/141,070, filed on May 31, 2005, now abandoned.

(60) Provisional application No. 60/575,914, filed on Jun. 1, 2004.

(51) Int. Cl.
    *A21C 11/06*    (2006.01)
(52) U.S. Cl.
    USPC .......... 425/193; 425/364 R; 425/397; 99/353; 426/512
(58) Field of Classification Search
    USPC ............. 425/143, 145, 364 R, 355, 359, 169, 425/197, 167, 398; 426/512; 99/349, 353
    See application file for complete search history.

(56) References Cited

U.S. PATENT DOCUMENTS

| | | | |
|---|---|---|---|
| 2,425,719 A | 8/1947 | Berger | |
| 2,829,606 A | 4/1958 | Dielentheis | |
| 3,368,479 A * | 2/1968 | Gregorovich | 100/229 R |
| 3,397,655 A | 8/1968 | Valadez et al. | |
| 3,565,015 A | 2/1971 | Jorgensen | |
| 4,153,550 A | 5/1979 | Lautrette | |
| 4,184,418 A | 1/1980 | Jimenez | |
| 4,197,792 A * | 4/1980 | Mendoza | 425/371 |
| 4,336,010 A * | 6/1982 | Thompson | 425/145 |
| 4,353,776 A | 10/1982 | Giulie et al. | |
| 4,371,414 A | 2/1983 | Ahrweiler | |
| 4,439,123 A * | 3/1984 | Sano et al. | 425/193 |
| 4,668,524 A | 5/1987 | Kirkpatrick | |
| 4,683,813 A | 8/1987 | Schultz | |
| 4,715,272 A | 12/1987 | Mendoza | |
| 4,760,777 A | 8/1988 | Welsh | |
| 4,905,581 A | 3/1990 | Kirkpatrick | |
| 4,938,126 A | 7/1990 | Rubio et al. | |
| 4,993,933 A * | 2/1991 | Yoshioka et al. | 425/190 |
| 5,006,358 A | 4/1991 | Ribio et al. | |
| 5,030,078 A * | 7/1991 | Matthews et al. | 425/133.1 |
| 5,044,264 A | 9/1991 | Forney | |
| 5,088,912 A | 2/1992 | Raque et al. | |
| 5,129,317 A * | 7/1992 | Gloe et al. | 100/48 |
| 5,231,919 A | 8/1993 | Lawrence et al. | |
| RE34,530 E | 2/1994 | Kirkpatrick | |
| 5,388,503 A | 2/1995 | Buerkle | |
| 5,396,833 A | 3/1995 | Atwood et al. | |
| 5,458,051 A | 10/1995 | Alden et al. | |

(Continued)

*Primary Examiner* — Joseph S Del Sole
*Assistant Examiner* — Thukhanh Nguyen
(74) *Attorney, Agent, or Firm* — Knobbe, Martens, Olson & Bear, LLC

(57) ABSTRACT

A reciprocating press is configured to press articles while moving in synchronicity with a conveyor belt carrying the articles. The press is driven through a rack and pinion system. The press can be used for pressing any type of article, including, but without limitation, pieces of dough for forming tortillas.

30 Claims, 17 Drawing Sheets

(56) References Cited

U.S. PATENT DOCUMENTS

| | | |
|---|---|---|
| 5,469,779 A | 11/1995 | Amore et al. |
| 5,501,140 A | 3/1996 | Balleza et al. |
| 5,547,695 A | 8/1996 | Ricke et al. |
| 5,564,554 A * | 10/1996 | Lawrence .................... 198/432 |
| 5,649,473 A | 7/1997 | Lawrence |
| 5,800,844 A | 9/1998 | Raio et al. |
| 5,918,533 A | 7/1999 | Lawrence et al. |
| 6,010,325 A | 1/2000 | Lawrence |
| 6,015,584 A | 1/2000 | Lawrence |
| 6,112,647 A | 9/2000 | Brunner et al. |
| 6,272,977 B1 | 8/2001 | Kolenda |
| 6,398,539 B1 | 6/2002 | Lawrence |
| 6,951,451 B2 * | 10/2005 | Schultz ..................... 425/145 |
| 6,969,246 B1 * | 11/2005 | Kundinger et al. ........... 425/515 |
| 7,229,270 B2 | 6/2007 | Schultz |
| 2005/0287240 A1 | 12/2005 | Mattias et al. |

* cited by examiner

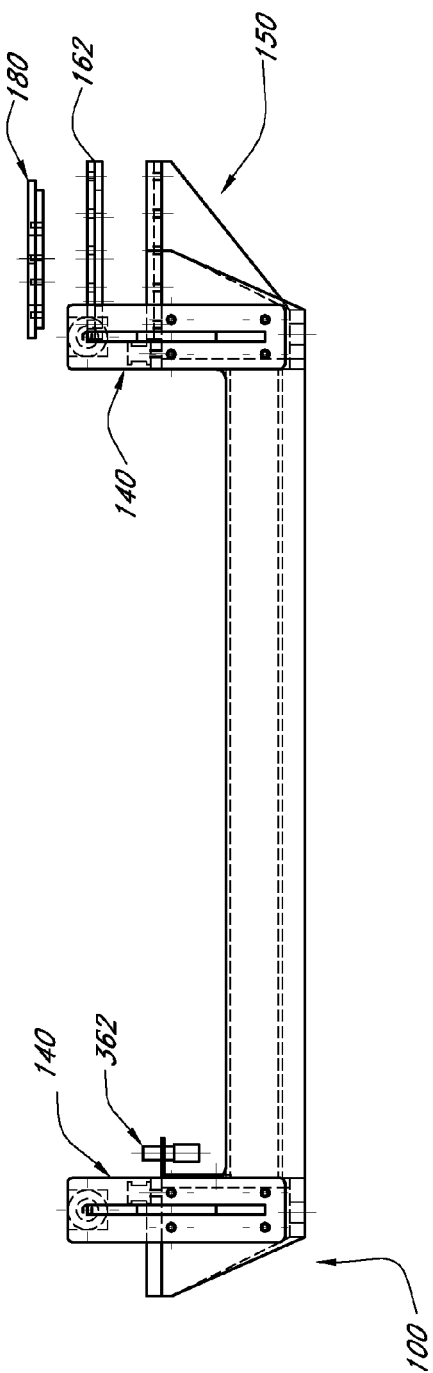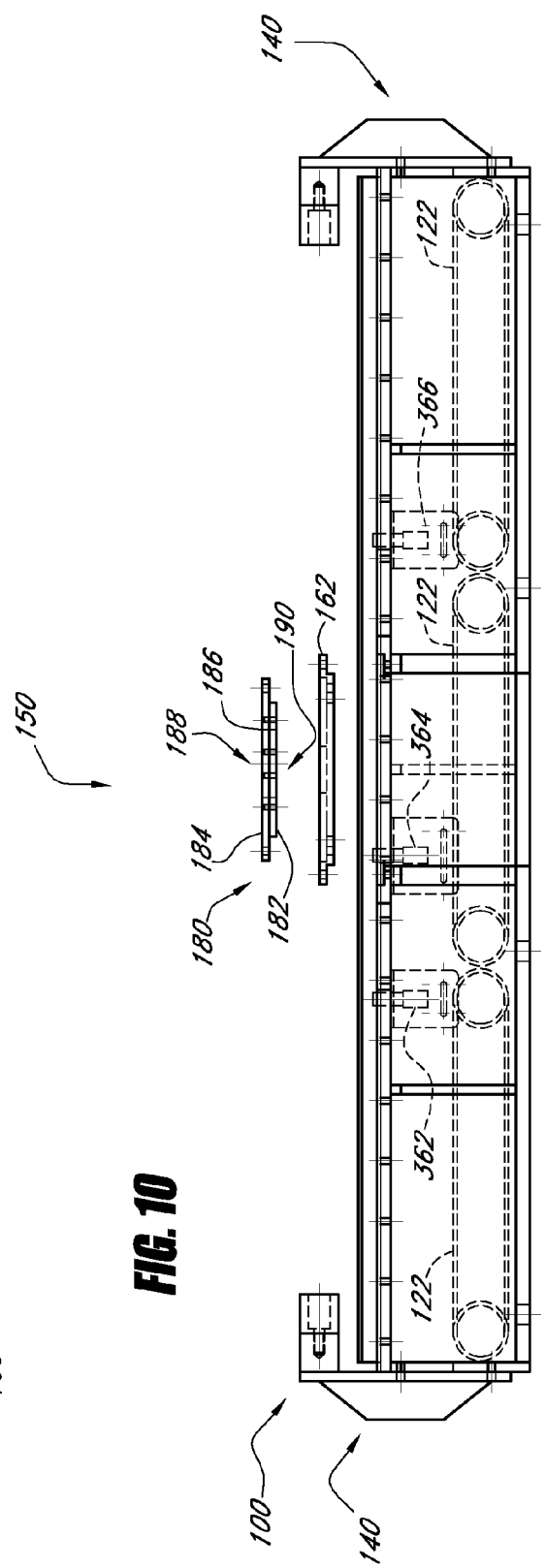

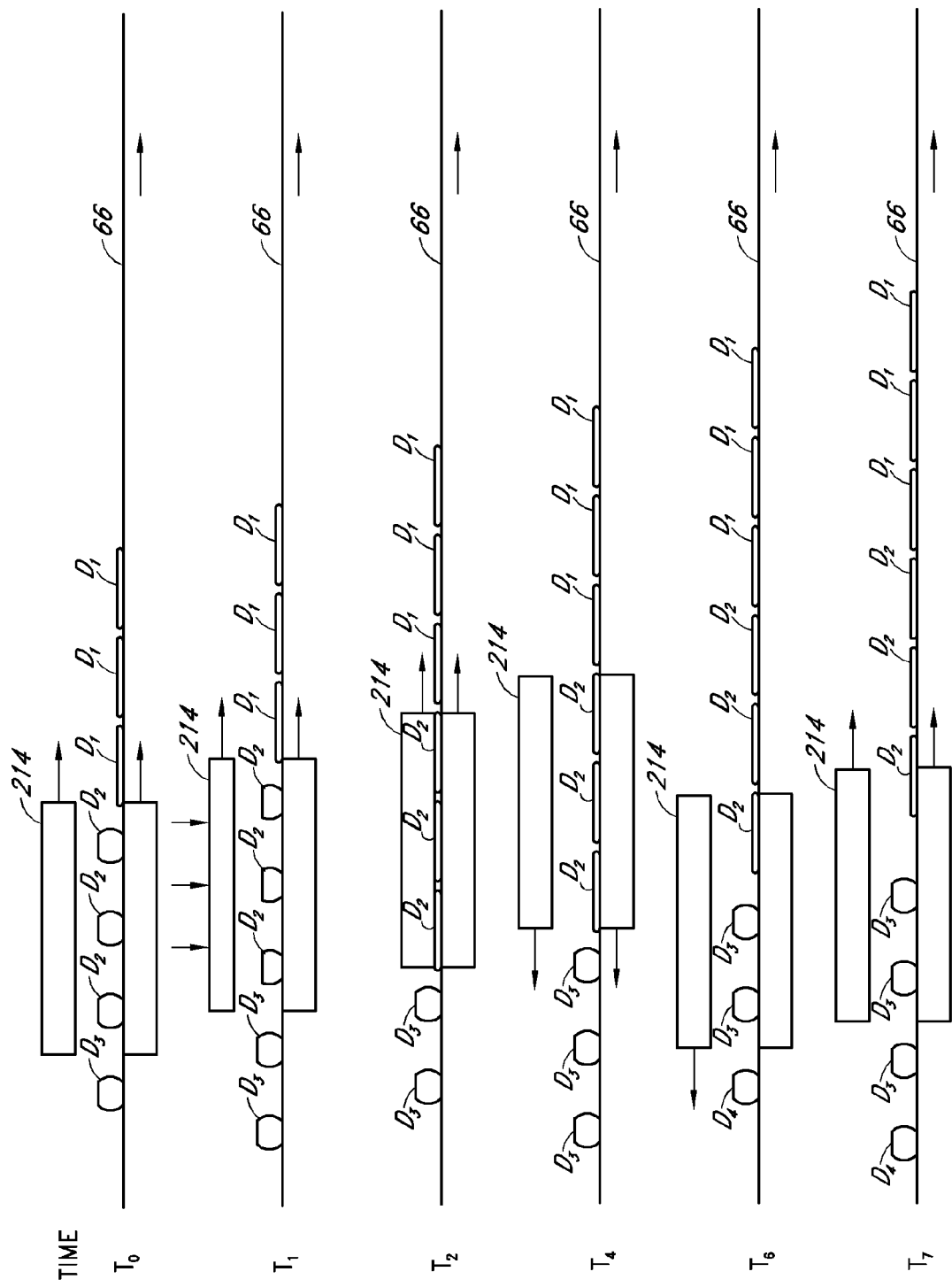

US 8,770,960 B2

MOVING HEAD DOUGH PRESS

RELATED APPLICATIONS

This application is a continuation of U.S. patent application Ser. No. 11/141,070, titled MOVING HEAD DOUGH PRESS, filed on May 31, 2005 which claims the benefit of U.S. Provisional Patent Application No. 60/575,914, filed on Jun. 1, 2004, both of which are hereby incorporated by reference in their entireties.

BACKGROUND OF THE INVENTION

1. Field of the Invention

The present application is directed to a press for use with a continuously moving conveyor belt, such as, for example, a press for flattening dough pieces into tortillas on a moving conveyor belt.

2. Description of the Related Art

In the field of the manufacture of dough-based food products such as tortillas, a difficulty arises in the portion of the manufacturing process directed to pressing the dough into flat shapes. One cause of such a problem is that bread dough is somewhat elastic. Thus, pressing a ball of such dough into a flat pancake or tortilla-like shape requires a significant amount of work.

One type of device developed for pressing balls of dough into tortilla shapes is disclosed in U.S. Pat. No. 5,006,358 issued to Rubio, et al., Apr. 9, 1991. Such a press includes upper and lower platens which are mounted to a reciprocating frame. The frame is driven so as to reciprocate along a path that is parallel to the movement of the upper surface of a moving conveyor belt. As balls of dough are moved on the conveyor belt, between the platens, the reciprocating frame is moved at the same speed as the conveyor belt while the platens are pressed together, thereby flattening a plurality of balls of dough into tortilla shapes. The platens are then moved away from each other as they are slowed and returned back to a starting position. As such, the press can simultaneously flatten a plurality of pieces of dough without requiring the conveyor belt to stop.

The drive mechanism of the U.S. Pat. No. 5,006,358 patent for driving the platen support incorporates an electric motor, a drive belt driven by the motor, a gear reduction device having an rotating output shaft, and an oscillator drive. The oscillator drive includes gear configured to convert the rotating motion of the output shaft of the gear reduction device into an oscillating motion of a pivot arm. The pivot arm is connected to the reciprocating frame so as to move the press in the forward and backward directions.

Another type of system, disclosed in U.S. Pat. No. 5,388,503, issued to Buerkle, Feb. 14, 1995, uses a single electric motor driving both the conveyor belt and another mechanism for reciprocating the reciprocating frame. The system incorporates a number of gear reduction devices and chains or drive belts.

Other known systems have used hydraulic rams to reciprocate platen supports for pressing dough pieces into flat shapes. For example, British Patent No. 1,504,171 issued to Bibbe, et al., discloses a press for pressing dough pieces into piecrusts. The press is driven by a hydraulic ram forwards and backwards along the direction of the movement of a conveyor belt carrying the dough pieces.

SUMMARY OF THE INVENTIONS

An aspect of at least one of the inventions disclosed herein includes the realization that the overall size of a drive mechanism used to reciprocate a platen support relative to a conveyor belt can be greatly reduced through the use of a rack and pinion system. For example, as noted above, several prior art systems for driving a press parallel to the movement of a conveyor belt include numerous devices defining the drivetrain between an actuator, such as an electric motor, and the reciprocating platen support. Generally, a platen press with sufficient strength for pressing a plurality of dough balls into flat tortilla shapes is quite large and heavy. Thus, a drive for moving the platen support reciprocally will have substantial power.

Such devices can create hazards for a work place. For example, powerful actuators driving chain drives, belt drives, and/or other reciprocating or rotating machinery can cause serious injuries. Such devices are usually covered with protective shielding to prevent human contact therewith. Such shielding thus further contributes to the large overall size of the equipment, thereby occupying a significant amount of floor space. By driving a reciprocating press with a rack and pinion arrangement, however, the total size of the system can be significantly reduced, thereby saving floor space and providing a safer working environment.

In accordance with another aspect of at least one of the inventions disclosed herein, a press comprises a conveyor configured to transport articles along a transport direction, a first platen, and a second platen. At least one of the first and second platens are configured to be moveable in a pressing direction transverse to the transport direction. A press assembly supports the first and second platens, with the conveyor passing between the first and second platens. A transverse drive is supported by the press assembly and is configured to move at least one of the first and second platens into a pressing relationship. A parallel guide is configured to allow the press assembly to reciprocate parallel to the transport direction. Additionally, a parallel drive is configured to move the press assembly parallel to the transport direction. The parallel drive comprises an output shaft, a pinion gear mounted to the output shaft, and a rack gear meshed with the pinion gear.

Another aspect of at least one of the inventions disclosed herein includes the realization that a position of an actuator can be made adjustable by mounting the actuator to a rotatable member having a rotational axis and an actuator mounting axis offset from the rotational axis. For example, but without limitation, where the actuator has a rotating output shaft and a gear mounted to the end of the shaft, the actuator can be mounted to the rotatable member such that the rotational axis of the output shaft extends along the actuator mounting axis. Thus, when the rotatable member is rotated about it's rotational axis, the output shaft translates about the rotational axis of the member. This allows the spacing of the output gear to driven gear to be adjusted easily.

A further advantage is provided where fasteners are providing at a distance from the rotational axis of the rotatable member that is greater than the offset between the actuator mounting axis and the rotational axis of the member. By arranging the fasteners as such, the fasteners have a greater moment arm for resisting rotation of the member as compared to the moment arm defined by the offset of the actuator mounting axis and the rotational axis of the member. As such, the member can be better secured to resist rotation and thus prevent the output gear from moving out of mesh with the driven gear.

Thus, in accordance with a further aspect of at least one of the inventions disclosed herein, a press comprises a conveyor configured to transport articles along a transport direction. A press assembly supports first and second press members. A parallel drive comprises an output shaft configured to rotate about an output shaft axis and configured to move the press assembly parallel to the transport direction. An alignment assembly comprises a support member configured to rotate about an alignment axis. The support member is configured to support the drive such that the output shaft axis is offset from the alignment axis.

A further aspect of at least one of the inventions disclosed herein includes the realization that where a servomotor is used to reciprocate a press, the drivetrain used to transfer the power output from the servomotor to the movement of the press can be greatly simplified. For example, prior art reciprocating press systems include a large number of moving parts. Additionally, where the reciprocating movement of such systems are provided with electric motors, additional devices are used to provide a braking force for slowing and reversing the direction of movement of the press. For example, one known system in which the reciprocating movement of the press in the direction of an associated conveyor belt is provided by a constant speed electric motor driving an oscillator drive. The oscillator drive has an input shaft and a pivot arm which reciprocates in a direction parallel to the conveyor belt as its input shaft is turned at constant speed. Internal gears transfer power from the input shaft to the pivot arm. The internal gears provide braking force. However, this arrangement requires significant space and shielding to prevent injuries caused by the pivot arm.

In accordance this aspect, a press is provided that comprises a conveyor configured to transport articles along a transport direction. A press assembly supports first and second press members. A servomotor unit is configured to directly drive the press assembly in a reciprocating manner along directions parallel to the transport direction.

In accordance with yet another aspect of at least one of the inventions disclosed herein, a press comprises a conveyor configured to transport articles along a transport direction. The press also includes a press assembly supporting first and second press members. Additionally, the press includes a parallel drive comprising a reversible electric servomotor unit with a rotating output shaft configured to move the press assembly in first and second directions that are parallel to the transport direction, without an additional device for converting the rotational movement of the output shaft into a reciprocating movement.

BRIEF DESCRIPTION OF THE DRAWINGS

The above-mentioned and other features of the inventions disclosed herein are described below with reference to the drawings of the preferred embodiments. The illustrated embodiments of the press are intended to illustrate, but not to limit, the inventions. The drawings contain 17 figures in which:

FIG. 9 is a front elevational and partial exploded view of the parallel guide assembly illustrated in FIG. 6;

FIG. 10 is a left side elevational and partial exploded view of the parallel guide assembly of FIG. 6;

FIG. 18 is a schematic representation of the moments of the platens at certain of the time periods illustrated in FIG. 17.

DETAILED DESCRIPTION OF THE PREFERRED EMBODIMENT

Figure 1:
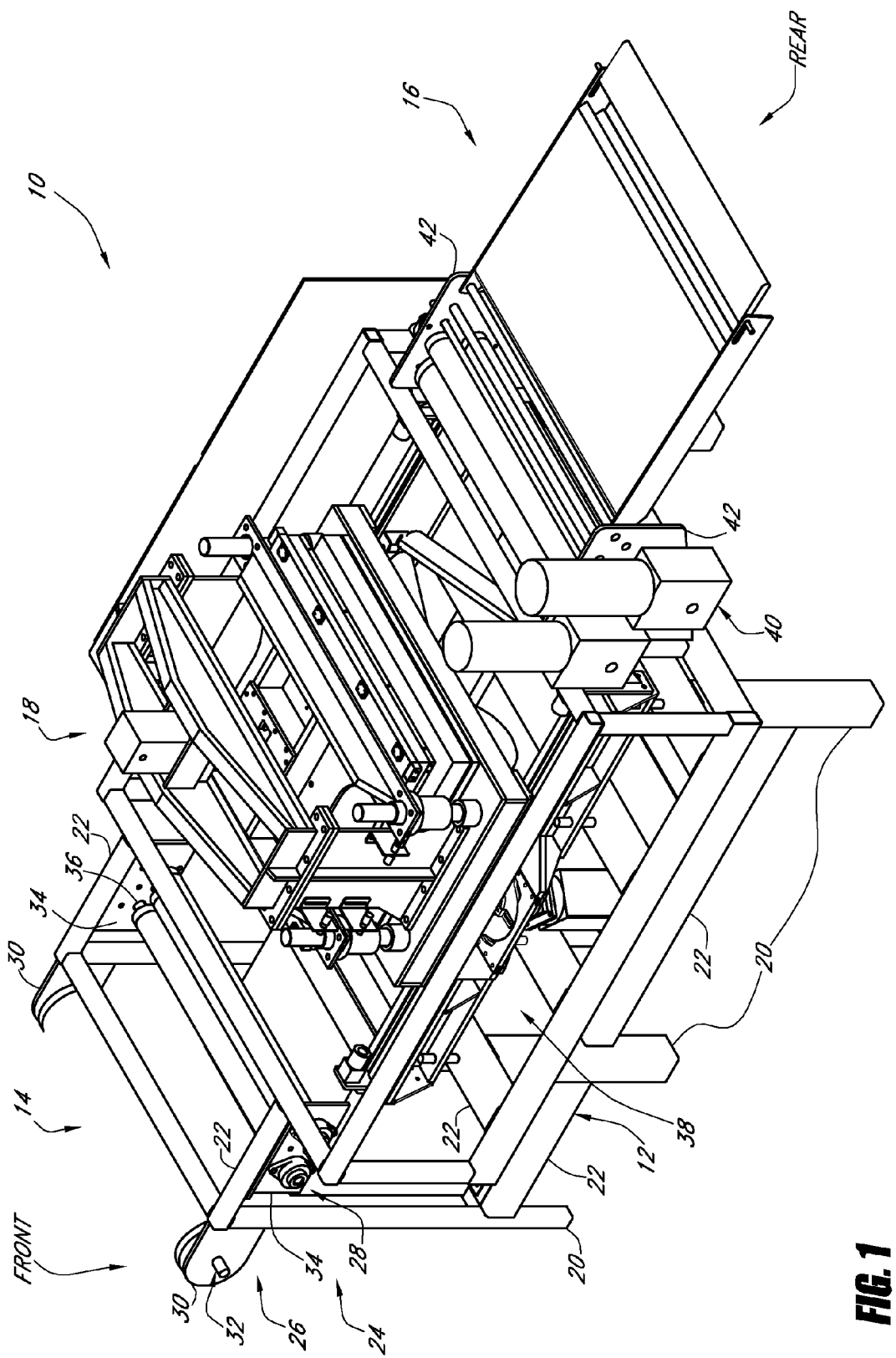
FIG. 1 is a top, rear, and left side perspective view of a reciprocating press system including a base support, conveyor belt drive assembly, a discharge belt drive assembly, and a reciprocating press assembly.
Figure 2:
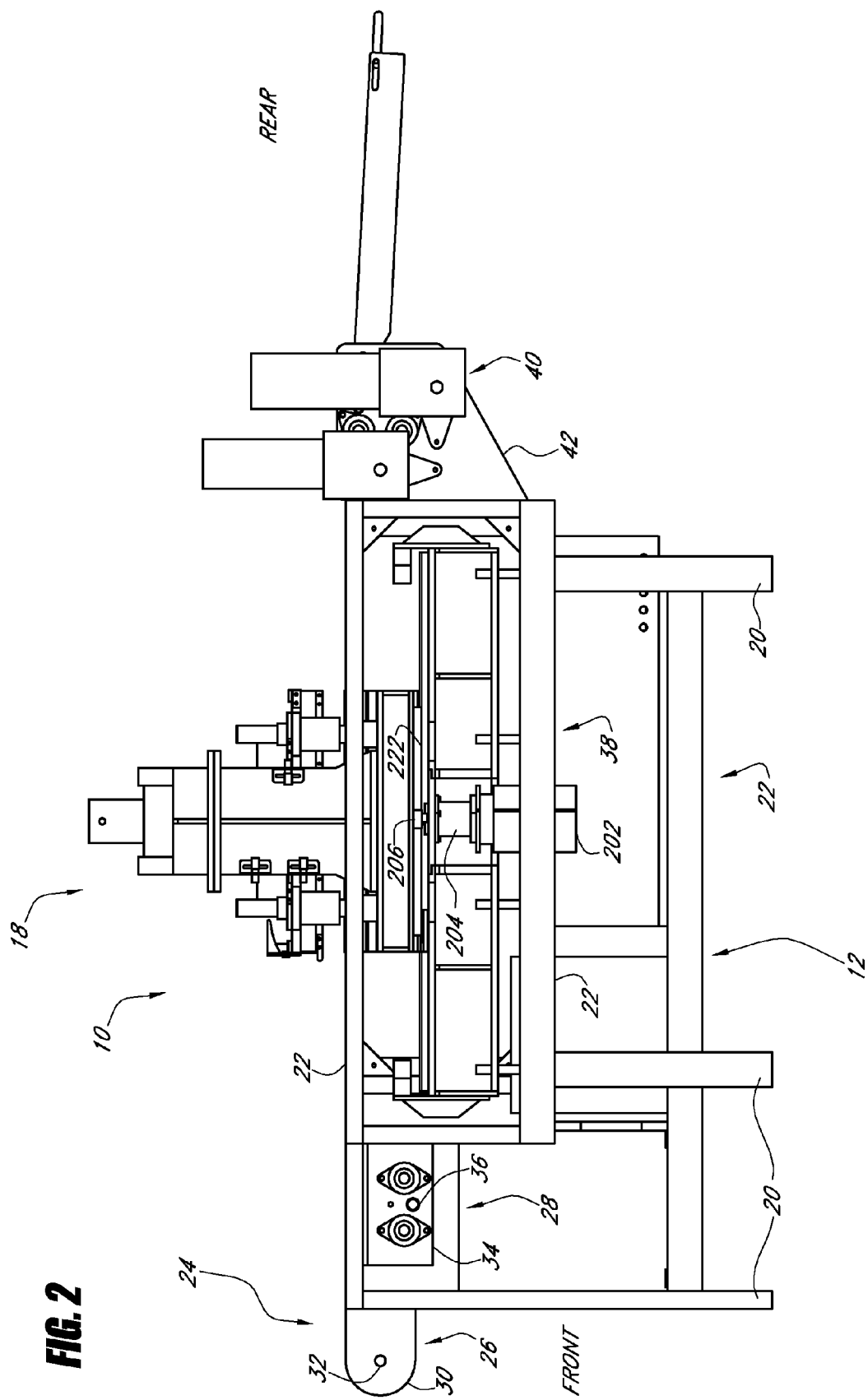
FIG. 2 is a left side elevational view of the reciprocating press system illustrated in FIG. 1.
Figure 3:
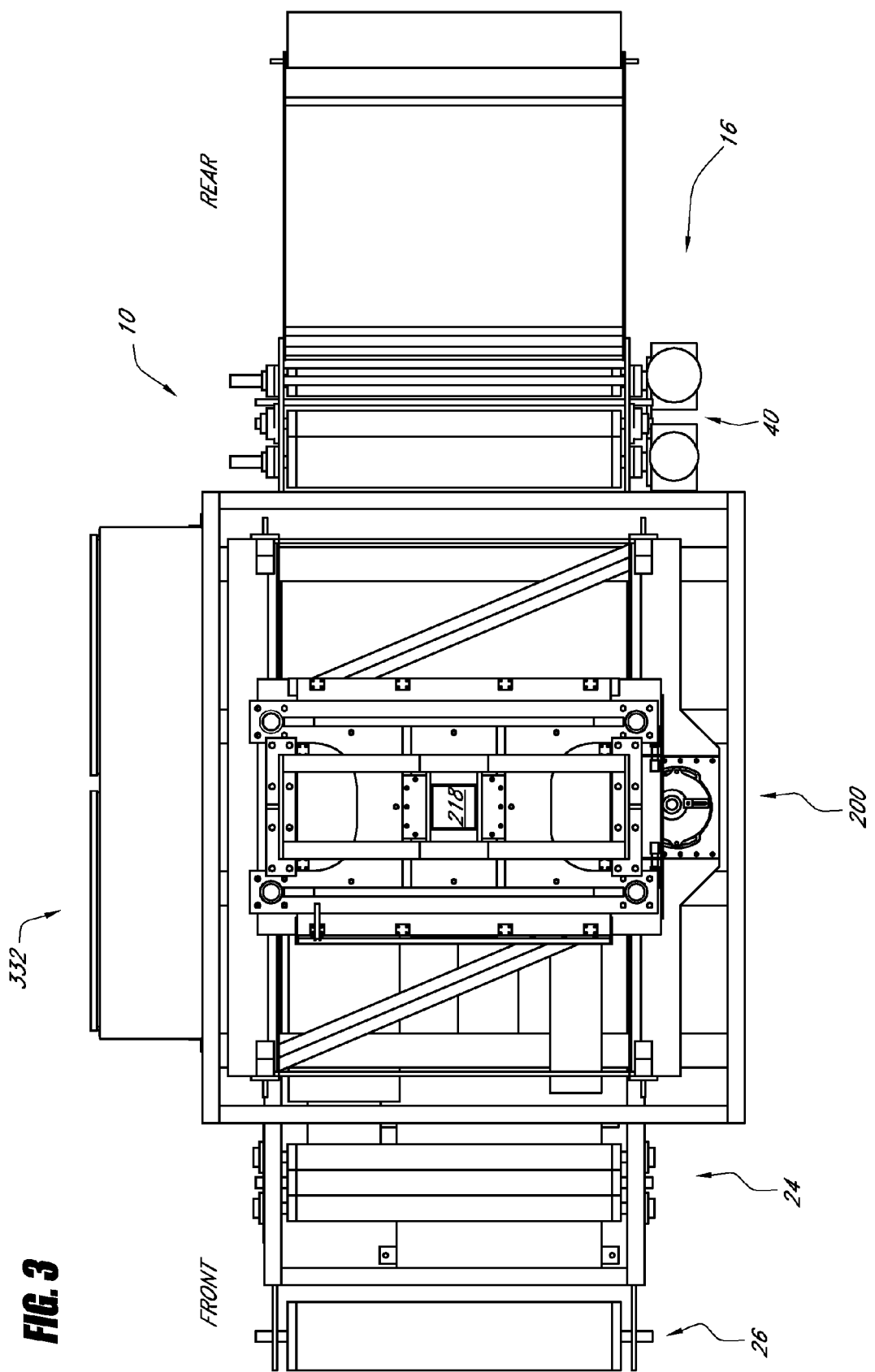
FIG. 3 is a top plan view of the reciprocating press system illustrated in FIG. 1.
Figure 4:
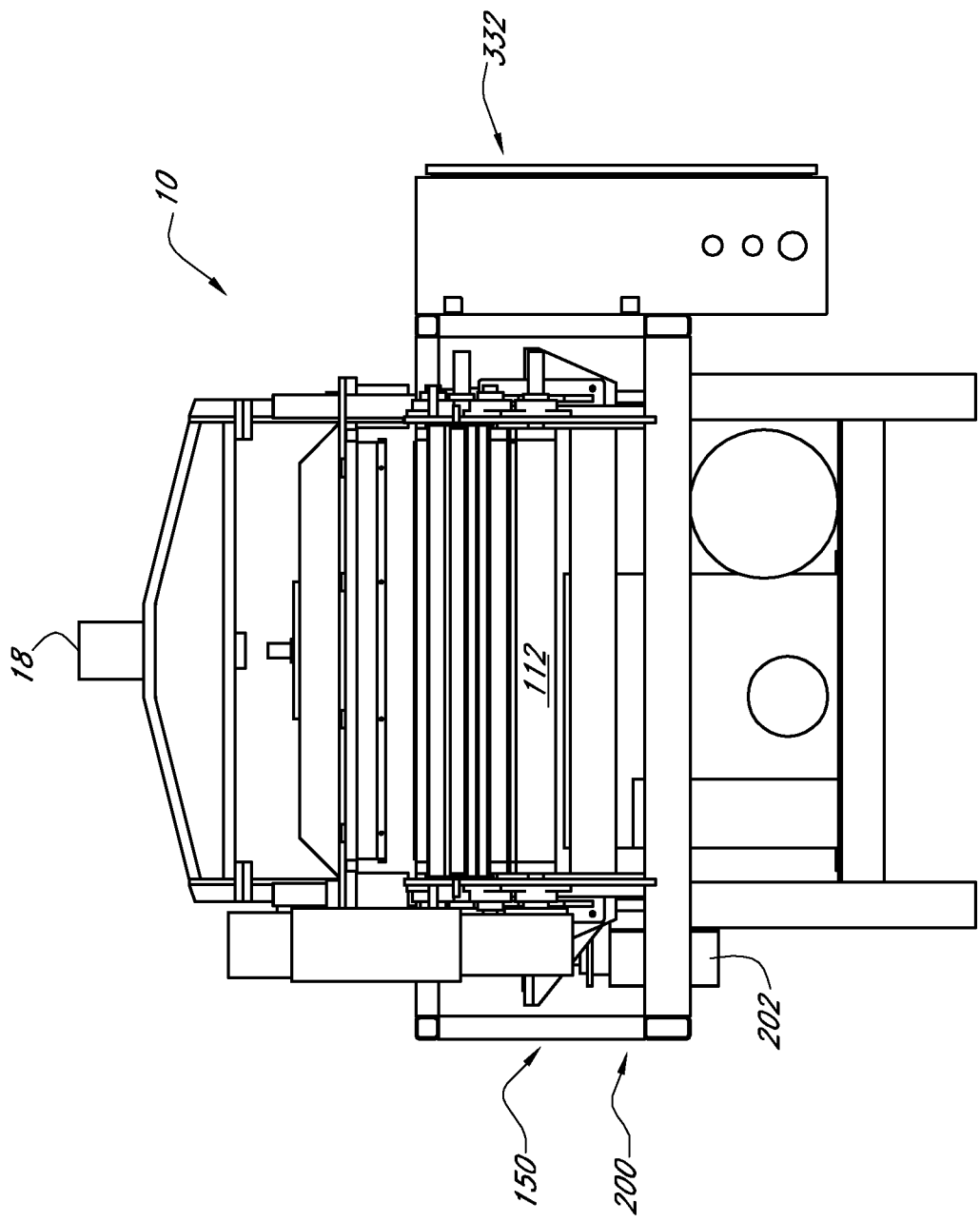
FIG. 4 is a rear elevational view of the reciprocating press system illustrated in FIG. 1.

The inventions disclosed herein have applicability to presses used in conjunction with continuously moving conveyor systems. However, an understanding of the inventions disclosed herein is facilitated with the following description of the application of the principles of the present inventions to dough pressing, and in particular, pressing dough pieces into tortillas.

With initial reference to FIGS. 1-5, a reciprocating press system 10 includes a support frame 12, a feed belt drive system 14, a discharge belt drive system 16, and a reciprocating press assembly 18. In operation, pre-formed dough balls are fed to the feed belt system 14 in a timed fashion, such that rows of dough balls are released onto a conveyor belt of the feed belt system 14. The belt moves the dough pieces between platens of the reciprocating press assembly 18. The press assembly 18 reciprocates back and forth in directions parallel to the direction along which the belt moves. The press assembly 18 presses the dough pieces while simultaneously moving with the belt and preferably at the same speed as the belt. After the press assembly 18 presses the dough pieces into flat shapes, the flattened dough pieces are discharged to the discharge portion 16. The discharge portion 16 can carry the flattened dough pieces to an oven where they can be baked into finished tortillas.

The frame support 12 includes a plurality of legs 20 and cross members 22 configured to provide support for the feed belt assembly 14, the discharge belt portion 16, and the press assembly 18. The support frame 12 includes an upstream roller support assembly 26 and a tensioner assembly 28 at a front end 24 of the press system 10.

The upstream roller support 26 is configured to rotatably support a rotatable member. In the illustrated embodiment, the upstream roller support 26 includes a pair of plates 30 mounted to a pair of the legs 20. The plates 30 can have any shape. In the illustrated embodiment, the plates have a profile configured to correlate generally to a roller. The plates include apertures 32 that are configured to receive a shaft that supports the roller; however, the plates 30 can include any other kind of feature for supporting a shaft.

The tensioner support portion 26 is also supported by the support frame 12. In the illustrated embodiment, the tensioner support portion includes a pair of plates 34. The plates 34 can be supported by the legs 20 or other cross members 22 of the frame support 12. Additionally, the plates 34 include a plurality of apertures 36 for rotatably supporting a tensioning device.

The frame support 12 also includes a central support portion 38 configured to support the reciprocating press assembly 18. The legs 20 and cross members 22 that form the central support portion 38 can be arranged to support the assembly 18. Preferably, the legs 20 and cross members 22 are configured to support the weight of the assembly 18, as well as the dynamic loads generated by the assembly 18. For example, when the assembly 18 is operating, a large portion of the assembly 18 reciprocates forward and backward along the press system 10. In one exemplifying embodiment, the reciprocating portion of the press assembly 18 can weigh approximately one ton.

Preferably, some of the cross members 22 are arranged so as to create a frame around the assembly 18. As such, the cross members 22 can support protective shielding around the assembly 18.

The frame support 12 also includes a drive support portion 40. The drive support portion 40, in the illustrated embodiment, includes a pair of plates 42 extending from the rear end of the central support portion 38. The plates 42 include a plurality of apertures configured to support actuators and a plurality of rollers, which are described in greater detail below.

Figure 5:
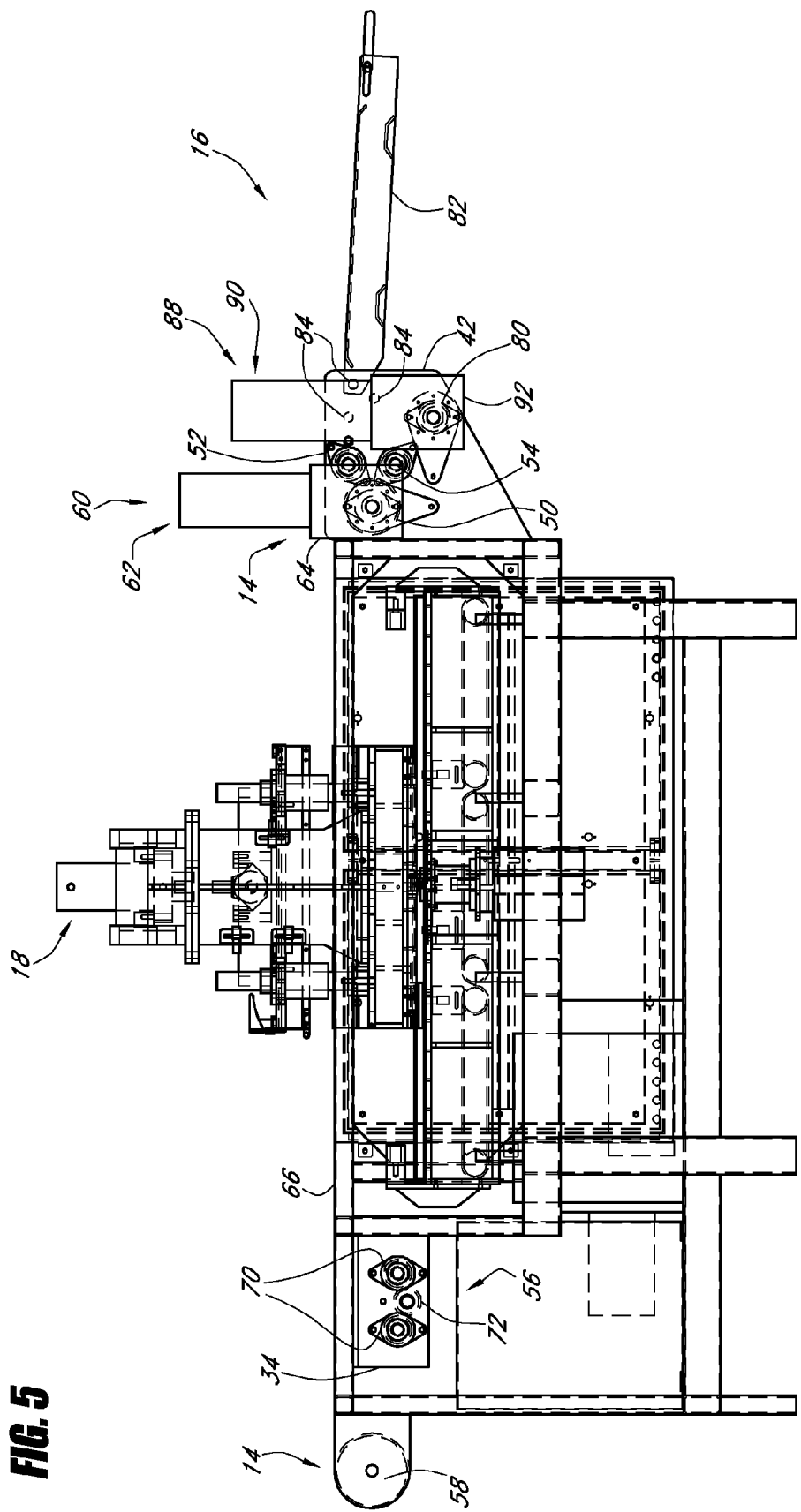
FIG. 5 is a left side elevational view of the reciprocating press system, as illustrated in FIG. 2, with certain internal components shown in phantom line, a main conveyor belt extending between the front and rear ends of the reciprocating press system, and a discharge belt disposed at the rear end of the reciprocating press system.

With reference to FIG. 5, the feed belt system 14 includes a drive roller 50, a pair of guide rollers 52, 54, a tension roller assembly 56, and a front end roller 58. The drive roller 50 is supported by a pair of bearings disposed at each end of the drive roller 50. A feed belt drive 60 is engaged with the drive roller 50. The drive 60 can be any type of drive. In the illustrated embodiment, the drive 60 includes an electric motor 62 and a gear reduction device 64.

In the illustrated embodiment, the gear reduction device 64 has an output shaft disposed at a 90° angle relative to the input from the electric motor 62. The electric motor 62 can be of any type, including, for example, but without limitation, a servomotor, a stepper motor, an a/c motor, or any other type of suitable electric motor. Alternatively, the drive 60 can include a hydraulic motor or any other type of suitable actuator.

The guide rollers 52, 54 are arranged rearward from the drive roller 50. This provides an advantage in that a conveyor belt 66 can be wrapped around the guide rollers 52, 54 and the drive roller 50 such that the conveyor belt 66 defines a concave contour around the drive roller 50, thereby maximizing the contact patch between the conveyor belt 66 and the outer surface of the drive roller 50. The guide rollers 52, 54 preferably are dispensed such that the contact patch is larger than 180° around the circumference of the drive roller 50.

The tension assembly 56 includes a pair of stationary rollers 70 and an adjustable roller 72. The rollers 70, 72 are supported by the plates 34. Additionally, the rollers 70, 72 are supported by suitable bearings.

By configuring the adjustable roller 72 to be movable, the effective path length of the conveyor belt 66 through the rollers 70, 72 can be increased, thereby increasing the tension in the conveyor belt 66.

The discharge belt drive 16 has a drive roller 80. The drive roller 80 can be in any configuration, depending on the environment of use. In the illustrated embodiment, the discharge drive 16 includes a mesh discharge belt 82. Thus, the drive roller 80 can be in the form of a smooth roller with at least a toothed portion, such as a sprocket, configured to engage a portion of the mesh discharge belt 82.

The discharge portion 16 also includes a plurality of guide rollers 84 to guide the discharge belt 82 along the desired path. The discharge drive 16 also includes a discharge drive 88. The discharge drive 88 can be any type of drive, as noted above with respect to the feed belt drive 60. In the illustrated embodiment, the discharge drive 88 includes an electric motor 90 and a gear reduction device 92. Preferably, the drives 60 and 88 are configured and/or controlled to drive the respective belts 66, 82 at the same linear speed. Thus, articles traveling on the conveyor belt 66, leave the belt 66, in the vicinity of the guide roller 52, and are then transferred to the belt 82.

An air nozzle (not shown) preferably is disposed in a gap between the conveyor belt 66 and the discharge belt 82. Thus, as articles move over the apex of the guide roller 52, a stream of air pushes the article upwardly so as to prevent the article from falling between the conveyor belt and the belt 82, thereby facilitating the transfer between the belts 66 and 82. This is particularly advantageous for dough products that have been pressed by the reciprocating press assembly 18. For example, dough products can stick to the conveyor belt 66 after being pressed into a flat shape. Although the conveyor belt 66 is preferably formed with a Teflon coating, dough products can stick to the conveyor belt 66 to prevent transfer to the belt 82. Thus, the preferred air nozzle is configured to provide a sufficient air flow to help dough products, such as tortillas, peel away from the conveyor belt 66 and transfer to the discharge belt 82.

Figure 6:
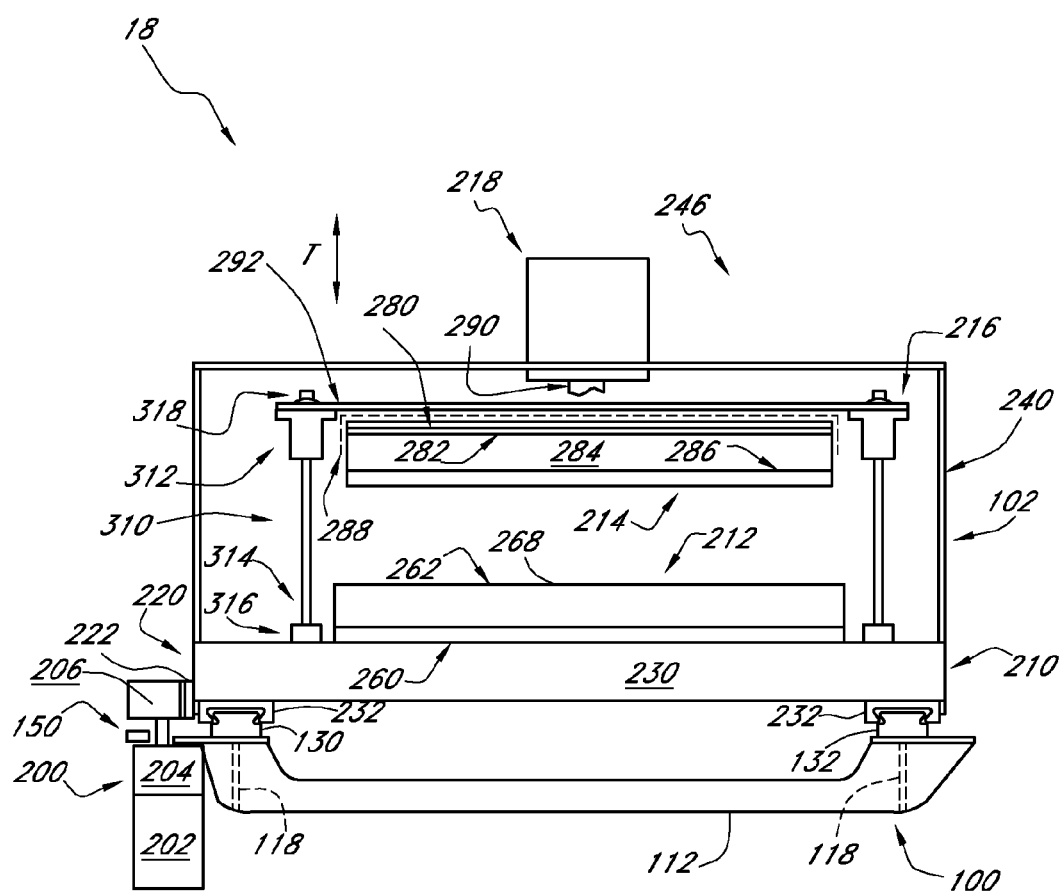
FIG. 6 is a schematic front elevational view of the reciprocating press assembly of FIG. 1 illustrating a parallel guide assembly and a reciprocating transverse press assembly.
Figure 7:
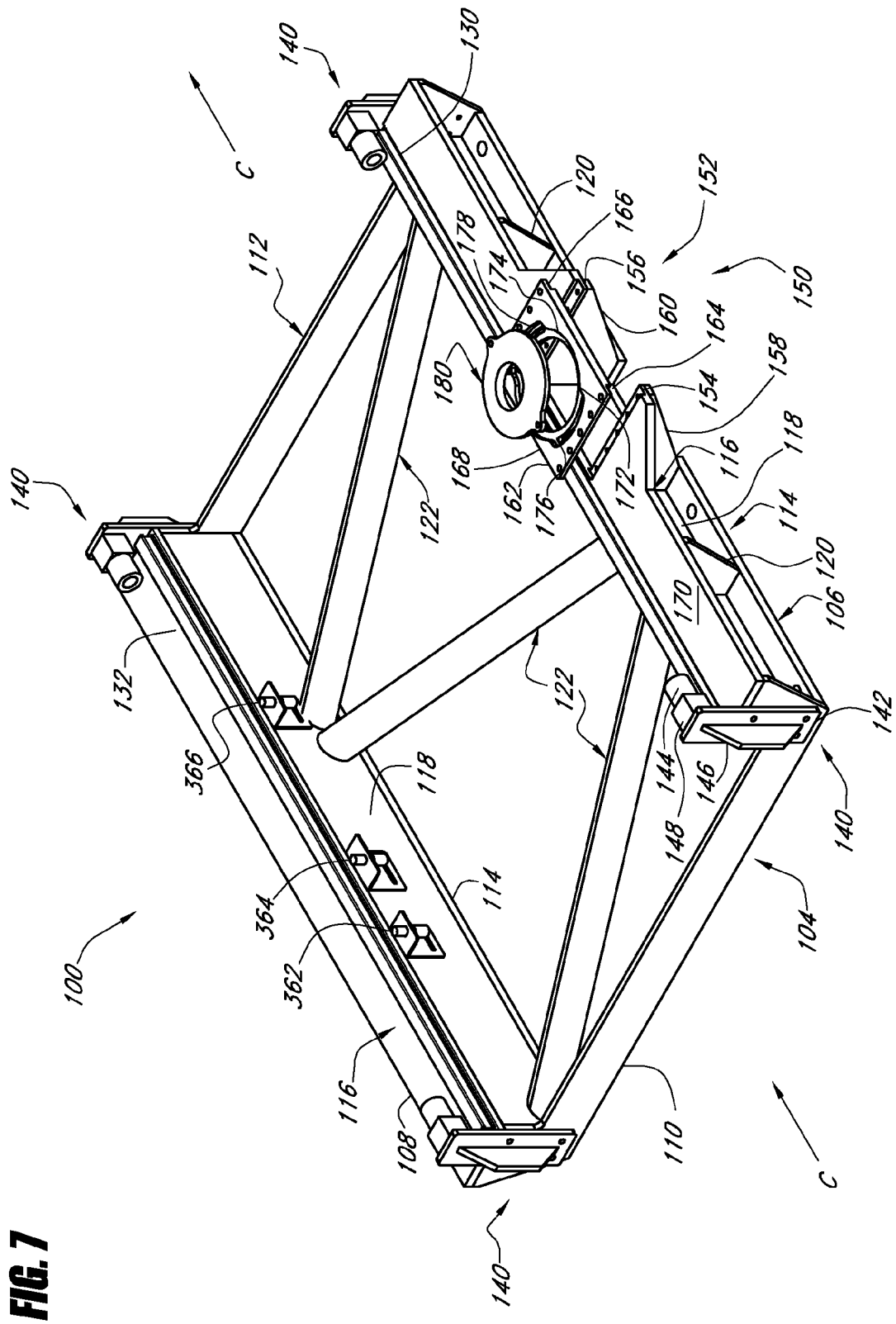
FIG. 7 is a front, top, and left side perspective view and partial exploded view of the parallel guide assembly illustrated in FIG. 6.

The press assembly 18 is schematically illustrated in FIG. 6. The press assembly 18 includes a parallel guide support 100 and a reciprocating platen assembly 102. An illustrative example of a parallel guide support 100 is illustrated in FIG. 7. For ease of description, arrow C indicates a direction of travel of the upper surface of the conveyor belt 66. The parallel guide support 100 is configured to support guides which are configured to define a direction of travel for the reciprocating platen assembly 102 that preferably is parallel, or at least substantially parallel, to the direction of travel C of the conveyor belt 66.

The parallel guide support 100 includes a frame 104 which includes side members 106, 108 and a pair of transverse end members 110, 112. In the illustrated embodiment, the side members 106, 108 include lower flanges 114 and upper flanges 116. A web 118 extends between the lower and upper flanges 114, 116. Additionally, the side members 106, 108 can include buttresses 120.

To provide further rigidity, the parallel guide support 100 can include cross members 122 extending between the side members 106, 108. Preferably, the cross members 122 are skewed relative to the transverse direction so as to provide enhanced rigidity. In the illustrated embodiment, the cross members 122 are pipes.

The parallel guide support 100 also includes linear guides 130, 132. The guides 130, 132 are arranged generally parallel to the direction of travel C of the conveyor belt 66. The linear guides can be any type of linear guide. In one exemplary embodiment, the linear guides 130, 132 are commercially available as "glide rails" and corresponding bearings. Where the press supported by the guides 130, 132 is a one-ton press, the guides 130, 132 can be size 30, AccuGlide linear guide series "BA"—standard long, available from Thompson Industries, Inc. of Illinois.

Preferably, the parallel guide support 100 includes stops 140 at each end of both the guides 130, 132. Each of the stops 140 includes a mounting portion 142 and a boss 144. The mounting portion 142 is rigidly secured to at least one of the end pieces 110, 112 and the side members 106, 108.

The boss portion 144 is disposed above and adjacent to the end of the respective guide 130, 132. Optionally, the boss 144 can be made from a hard rubber material so as to provide energy absorption if there is an impact against the boss 144. Further, the stops 140 can include a stiffening member 146. The construction and strength of the stops 140 will depend on the environment of use. For example, but without limitation, where the press assembly 102 is a one ton press, the mounting portion 142 and stiffening 146 can be made from half-inch steel plate. Additionally, the boss 144 can be mounted to a block 148 made from a 2" cube of solid steel.

The parallel guide support 100 further includes a drive mount assembly 150. The drive mount assembly 150 is configured to support one of a rack gear and a pinion drive assembly (discussed in greater detail below) that is used to move the press assembly 102 relative to the guide assembly 100. The reciprocating press assembly 102 can be moved relative to the parallel guide support 100 through a direct drive between a pinion and a rack gear. As such, the hardware used for reciprocating the press assembly 102 is greatly simplified in comparison to the prior designs noted above and is made compact.

A further advantage is provided where the pinion drive is supported by the parallel guide support 100. Thus, in the illustrated embodiment, the support 150 shown in FIG. 7, is configured to support a pinion gear drive.

In the illustrated embodiment, the support 150 is mounted within a cutout 152 of the upper flange 116. The cutout 152 includes recessed edges 154, 156, at the forward and rearward ends of the cutout 152. Directly below the recessed edges 154, 156, additional buttresses 158, 160 are mounted to provide further support for the assembly 150.

The assembly 150 includes a base plate 162. The base plate includes recessed portions 164, 166 at its forward and rearward edges, respectively. Preferably, the recessed edges 164, 166 are sized such that when the base plate 162 is disposed within the cut-out 152, the recessed edges 164, 166 mate with the recessed edges 154, 156 and the upper surface 168 of the base plate 162 is flush with the upper surface 170 of the flange 116. The forward and rearward edges of the base plate 162 can be connected to the flange 116 with any type of fastener, including, for example, but without limitation, bolts, screws, etc. Preferably, the fasteners extend through the recessed edges 154, 156, 164, 166.

Figure 8:
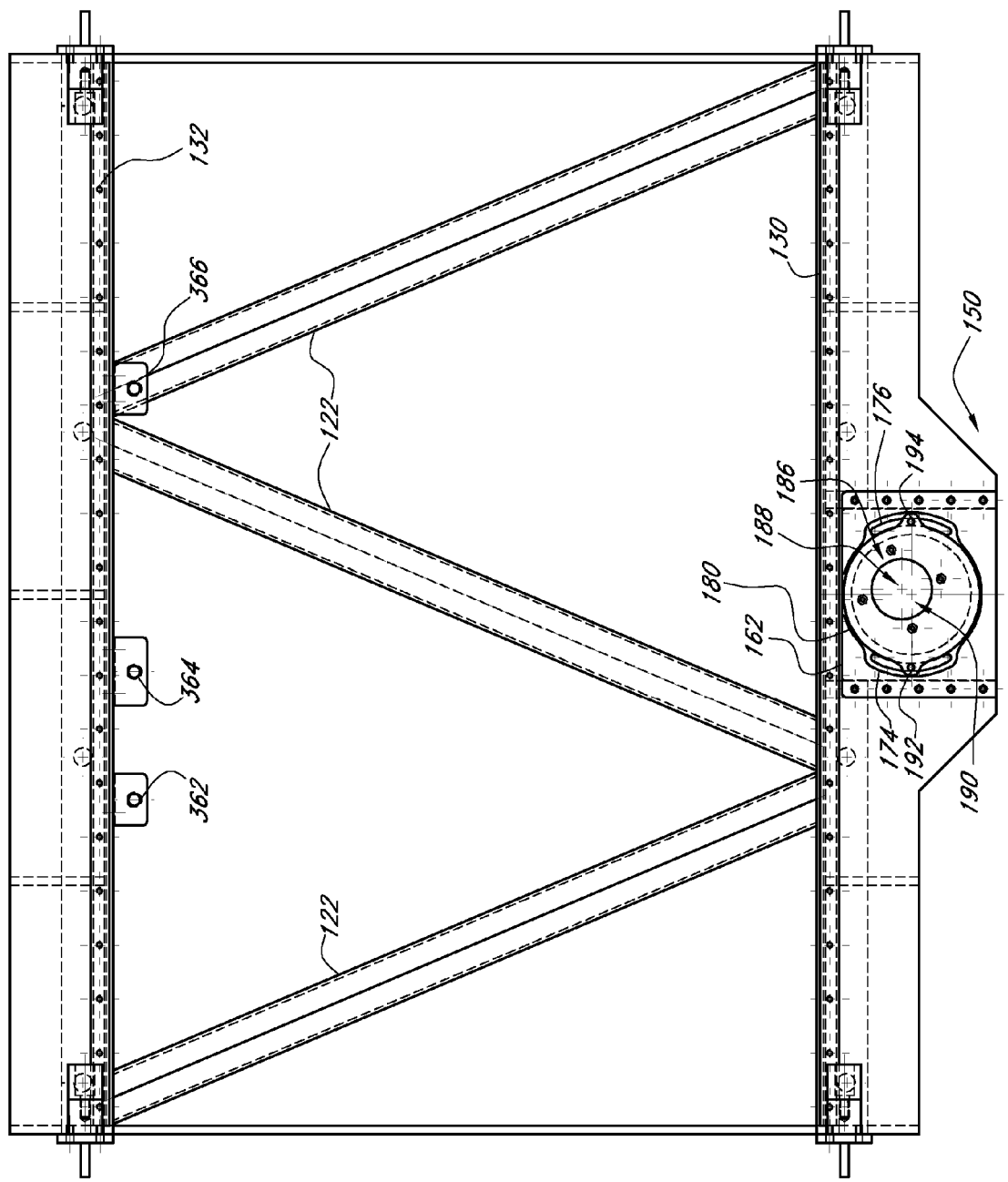
FIG. 8 is a top plan view of the parallel guide assembly illustrated in FIG. 6.

With reference to FIG. 8, the base plate 162 also includes a central aperture 172. A recessed annular flange 174 is defined in a recessed area of the base plate 162. Additionally, arcuate slots 176, 178 are disposed within the same recessed area as the flange 174. In the illustrated embodiment, the arcuate slots 176, 178 are disposed adjacent the forward and rearward recessed edges 164, 166 of the base plate 162. However, the arcuate slots 176, 178 can be disposed at any position around the aperture 174. Additionally, the arcuate slots 176, 178 preferably are defined along a radius of curvature which has its center at the center of the aperture 174.

The assembly 150 also includes an alignment plate 180. As shown in FIGS. 9 and 10, the alignment plate 180 includes a lower disk portion 182 and an upper disk portion 184. The lower disk portion 182 has a diameter that is approximately equal to the diameter of the aperture 172 in the base plate 162. Preferably, the diameter of the lower disk portion 182 is smaller than the inner diameter of the aperture 172 such that when the alignment plate 180 is disposed within the recessed area of the base plate 162, there is sufficient clearance between the outer surface of the disk portion 182 and the aperture 172 so that the alignment plate 180 can rotate within the recessed area of the base plate 162.

The alignment plate 180 further includes an aperture 186 that extends through the upper and lower disk portions 184, 182. The center 188 of the aperture 186 is offset from a center 190 of the outer diameter of the lower disk portion 182. The offset of the centers 188, 190 provides a further advantage in the installation and adjustment of the drive components for driving the press assembly 102 reciprocally along the guides 130, 132, as described in greater detail below.

The alignment plate 180 further includes two apertures 192, 194. Preferably, the centers of the apertures 192, 194 are aligned along a radius of curvature having its center at the center 190 of the outer diameter of the lower disk portion 182 and having the same radius as the radius of curvature of the arcuate slots 176, 178. As such, as viewed in FIG. 8, the apertures 192, 194 are aligned with the arcuate slots 174, 176. Thus, when the alignment plate 180 is received within the recessed area of the mounting plate 162, each aperture 192, 194 aligns with the respective arcuate slot 174, 176.

A further advantage is provided where releasable fasteners, such as, but without limitation, bolts, can be inserted through the apertures 192, 194 and the arcuate slots 174, 176 so as to anchor the alignment plate 180 in a desired angular position relative to the mounting plate 162. Because the centers 188, 190 are offset, the center 188 of the alignment plate 180 can be moved toward or away from the guide 130 by rotating the alignment plate 180. Thus, a position of the center 188 of the aperture 186 can be adjusted.

With reference to FIG. 6, the assembly 150 supports a drive 200. Preferably, the assembly 150 supports the entire weight of the drive 200. The drive 200 can be constructed with any type of drive mechanism that can provide reciprocating movement of the platen assembly 102.

However, a further advantage is provided where the drive 200 includes a servomotor 202. By using a servomotor, such as the servomotor 202, other components present in prior art designs can be eliminated while their function is retained. For example, all of the known prior art designs which include an electric motor as the source of power for reciprocating a platen assembly, similar to the platen assembly 102, also include an additional drivetrain mechanism for converting the non-reversing movement of the output shaft of the electric motor into a reciprocating movement.

One known prior art system includes a device referred to as an oscillator drive that converts a non-reversing movement of the output shaft of an electric motor into a reciprocating movement of a pivot arm. Another known prior art system includes an additional chain drive for converting a non-reversing movement of an electric motor into a reciprocating movement. These devices not only convert a non-reversing rotational movement into a reciprocating movement, but also provide a substantial part of the braking forces required to slow the reciprocating press assembly as it nears an end of its movement, and reverses direction.

Such additional devices add bulk to the system, not only due to the size of their components, but also due to the additional shielding that is commonly used to protect workers from injury in the vicinity of reciprocating and rotating machinery. However, a servomotor can provide substantial braking force and can be reversed under high loads. Thus, by using a servomotor, such as the servomotor 202, for generating the reciprocal movement of the reciprocating press assembly 102, additional components can be eliminated, thereby reducing the total size and the total number of parts of the drive 200 is reduced, relative to the prior art systems. Thus, the size of additional shielding (not shown) that can be disposed around the drive 200 can also be reduced.

In the illustrated embodiment, the servomotor 202 is connected to a gear reduction device 204 and a pinion gear 206 mounted to an output shaft of the gear reduction device 204. In this arrangement, the servomotor 202 and the gear reduction device 204 together define a servomotor unit. Additionally, in the illustrated embodiment, the pinion gear 206 includes helical teeth configured to mesh with a rack gear (described below) mounted to the press assembly 102. In an illustrative embodiment, the servomotor 202 preferably is an M1453L servomotor commercially available from Compumotor of Rohnert Park, Calif. The gear reduction device 204 can be any type of gear reduction device. In one illustrative embodiment, the gear reduction device 204 provides a 10:1 gear reduction. While the servomotor 202 is used with a rack and pinion drivetrain mechanism in the illustrated embodiment, many of the advantages disclosed herein can be obtained when the servomotor 202 is used with other types of drivetrain mechanisms.

With continued reference to FIG. 6, the press assembly 102 includes a support frame 210, a lower platen assembly 212, an upper platen assembly 214, a transverse guide assembly 216, and a transverse actuator 218. Additionally, the assembly 102 includes a support 220 for supporting one component of the parallel drive 200.

As noted above, the support 150 supports the parallel drive 200 which includes the pinion gear 206. Thus, in the illustrated embodiment, the support 220 provides support for a rack gear 222 that meshes with the pinion gear 206 to drive the press assembly 102 along the guides 130, 132. Alternatively, the support 220 can be configured to support the servomotor 202, gear reduction device 204, and the pinion gear 206. In this alternative, the support assembly 150 can be configured to support the rack gear 222. As such, the servomotor 202, gear reduction device 204, and the opinion gear 206 reciprocates with the reciprocating platen assembly 102 while the rack gear 222 remains stationary relative to the support frame 100.

Figure 11:
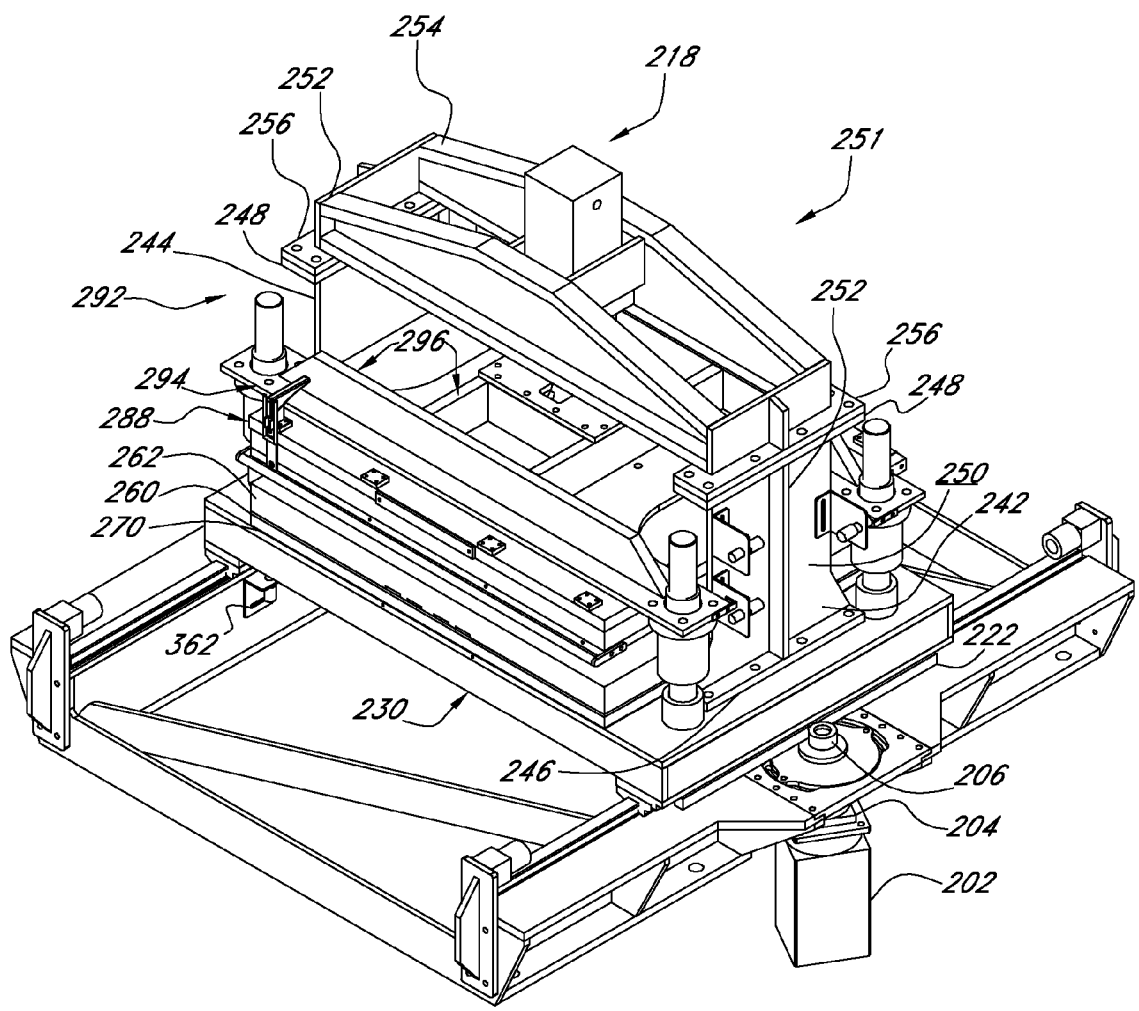
FIG. 11 is a front, top, and left side perspective view of the reciprocating press assembly shown in FIG. 6, removed from the belt drives and supports illustrated in FIG. 1.

With reference to FIGS. 6 and 11, the support 210 can include a base member 230. In the illustrated embodiment, the base member 230 is in the form of a thick rectangular piece of steel, however, the base 230 can be in any shape and can be made from a material having a suitable strength and rigidity. It also is preferable that the base member be highly rigid so as to resist bending and twisting forces that can be imparted to it.

Additionally, in the illustrated embodiment, the base member 230 is generally larger than the platen assemblies 212, 214 and extends over the guides 130, 132. On a lower surface thereof, the base plate 230 includes a plurality of carriages 232 which include bearing surfaces for providing sliding engagement with the guides 130, 132.

A transverse drive support 240 is supported by the upper surface of the base plate 230. The transverse drive support 240 is configured to support the transverse actuator 218 relative to the base 230. In the illustrated embodiment, as shown in FIG. 11, the support 240 includes left and right support legs 242, 244, respectively. The support legs 242, 244 can have any desired shape or construction, provided that the legs 242, 244 are sufficiently strong to support the transverse drive 218. In the illustrated embodiment, the legs 242, 244 include lower flanges 246, upper flanges 248 and a webbed portion 250. Additionally, the legs 242, 244 include a stiffening rib 252 extending between the lower and upper flanges 246, 248.

The upper flanges 248 of the legs 242, 244 support a cross member assembly 251. The cross member assembly 251 is configured to support the transverse drive 218. In the illustrated embodiment, the cross member assembly 251 includes front and rear cross members 252, 254. The cross members 252, 254 include lower flanges 256 which are supported by the leg upper flanges 248. The flanges 248, 256 can be fastened together by, for example, but without limitation, screws, bolts, and welding.

Additionally, in the illustrated embodiment, the cross members 252, 254 are in the shape of channel members having a maximum height at a central portion thereof and a smaller height at the left and right ends thereof. As such, the cross members 252, 254 provide greater resistance to bending in the area that would be subjected to the greatest bending moment under the load generated by the transverse press 218.

The transverse press 218 can be connected to the cross member assembly 250 in any known manner. In the illustrated embodiment, the transverse drive 218 is a hydraulic cylinder. The size of the transverse drive 218 depends upon the application. In one exemplary embodiment, the hydraulic cylinder of the transverse press 218 provides a force of approximately 15,000 pounds. Of course, other types of actuators (e.g., electric, pneumatic) can also be used to raise and lower the upper platen assembly 214 and/or to press the upper platen assembly 214 towards or against the lower platen assembly 212.

With reference again to FIG. 6, the support 210 also provides support to the lower platen assembly 212. The lower platen assembly 212 can be in the form of any type of press platen. Preferably, however, the lower platen assembly 212 comprises at least an insulation layer 260 and a heated portion 262. The insulation layer can be any type of insulator. By way of an example, the insulation layer 260 is made from 1-inch thick calcium silicate.

The heated portion 262 can be configured to provide heating of articles to be pressed between the platens 212, 214. For example, when pressing pieces of dough into tortillas with platens, it is known heated platens can heat the dough quickly during a pressing operation, thereby softening the dough, and allowing the dough to be pressed into a thin shape more quickly.

Figure 15:
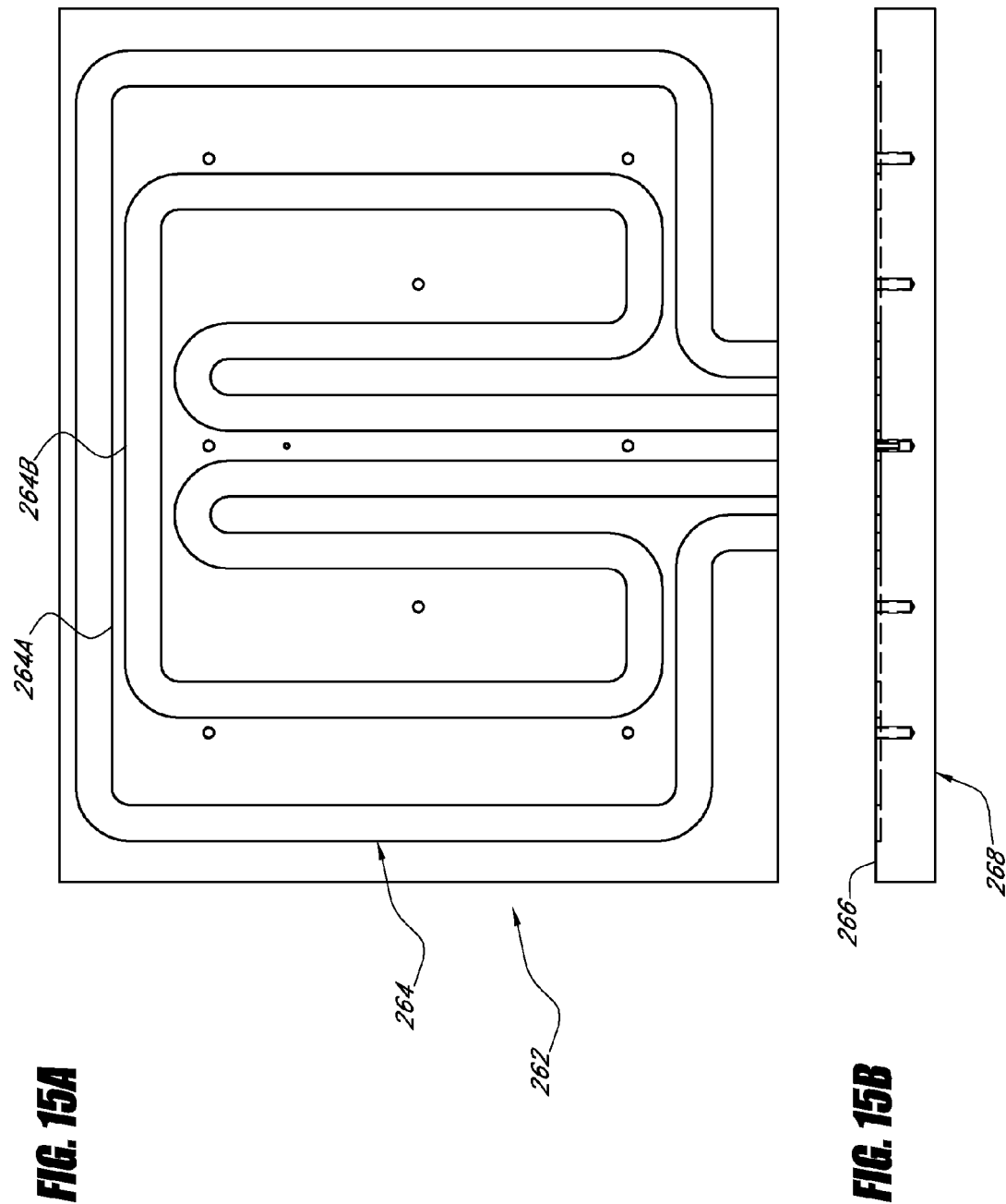
FIG. 15A is a plan view of a heater core portion of a platen assembly included in the reciprocating press assembly illustrated in FIG. 1.
FIG. 15B is an elevational view of the heater core portion of a platen assembly shown in FIG. 15A.

The heated portion 262 preferably comprises a smooth upper surface which forms the load-bearing surface for pressing articles on the lower platen assembly 212. With reference to FIG. 15, the heated portion 262 is preferably formed from a hard material, such as a metal. Additionally, the heated portion 262 preferably includes heating passages 264 for receiving a heating medium. For example, the heating medium can include heating fluids such as water, or other liquids, as well as electric heating elements. In an illustrative, but non-limiting example, the passages 264 are sized to receive 1-inch electric heating elements, such as those presently commercially available under the trade name FireBar® heating elements from Watlow Industries, Hanowbel, Mo. In the illustrated embodiment, the passages 264 can be in the form of open channels disposed in the surface 266 of the heated portion 262.

Preferably, the passages 264 are divided into more than one separate passage. For example, in the illustrated embodiment, the passages 264 includes an inner passage 264A and an outer passage 264B. As such, the passages 264A, 264B can receive separate heating elements. This provides a further advantage in that each of the passages 264A, 264B can support heating media with different heat transfer rates. In an illustrative but non-limiting embodiment, an 11350 watt FireBar® heating element is disposed in the outer passage 264A and an 8650 watt FireBar® heating element is disposed in the inner passage 264B.

The opposite surface 268 of the heated portion 262 forms the pressing surface of the heated portion 262. The heated portion 262 is mounted to the insulation layer 260 such that the surface 266 with the heating elements, is adjacent to the insulation layer 260. Thus, heat generated by the heating elements disposed in the passages 264 is inhibited from being conducted into the base 230. Additionally, by disposing the heating elements at the surface 266 opposite the pressing surface 268, the heat generated by the heating elements can spread more evenly to the surface 268. Thus, the heating provided by the heated portion 262 will be more evenly applied to articles that are pressed by the press system 10, such as, for example, pieces of dough.

With reference to FIG. 11, the illustrated embodiment also further includes an additional layer 270 disposed below the insulation layer 260. In an illustrative and non-limiting example, the additional layer 270 can be formed of ¼-inch thick 6061 cast aluminum. In this embodiment, the heated portion 262 can be in the form of 2½-inch thick cast aluminum T.P. (tooling plate).

The upper platen assembly 214 can be constructed in the same manner as the lower platen assembly 212. In the illustrated embodiment, the upper platen assembly 214 comprises the first support plate 280, an insulation layer 282, and a heated portion 284. As noted below with respect to the lower platen assembly 212, in an exemplary but non-limiting embodiment, the support plate 280 can be formed from 1¼-inch thick 6061 cast aluminum, the insulation layer can be formed from 1-inch calcium silicate and the heated portion 284 can be formed from 2½-inch thick cast aluminum T.P.

Optionally, the upper platen assembly 214 can include a die plate 286. The use of an additional plate beneath the heated portion 284 provides a further advantage in that because the lower surface of the upper platen surface 214 makes contact with the pieces of dough that are moved between the lower and upper platen assemblies 212, 214, the lower surface of the upper platen assembly 214 can become worn. Thus, the use of an additional member beneath the heated portion 284 protects the heated portion from damage.

The die plate 286 preferably is removable. Devices for securing the die plate to the rest of the upper platen assembly 214 are described below.

Additionally, the upper platen assembly 214 can also include an insulation cover member 288 (illustrated in phantom line in FIG. 6.) The cover member 288 can provide further protection for the insulation layer 282. For example, but without limitation, the cover member 288 can extend around the outer peripheral edge of the insulation layer 282 so as to protect the insulation layer 282 from impacts. Such impacts can be caused by, for example, devices used for securing the die plate 286 to the remainder of the platen assembly 214. In an exemplary but not limiting embodiment, the cover 288 can be formed from a sheet of 16-gauge stainless steel.

To provide a pressing function, at least one of the platen assemblies 212, 214 are movable in a transverse direction (e.g., a vertical direction in the illustrated embodiment) relative to the conveyor belt 66 (FIG. 5). In the illustrated embodiment, the upper platen assembly 214 is configured to be movable in a vertical direction relative to the lower platen assembly 212 and generally transverse to the direction of travel of the conveyer belt 66.

With continued reference to FIG. 6, the transverse drive 218 includes an output member 290 which is driven reciprocally in a vertical direction by the transverse drive 218. A lower end of the output member 290 (not shown) transfers forces in a direction transverse to the conveyer belt 66 in the directions of arrows T to move the upper platen assembly 214 up and down.

In order to distribute the load generated by the output member 290, a support assembly 292 is provided between the upper platen assembly 214 and the output member 290 (schematically illustrated in FIG. 6). With reference to FIGS. 11-14, the assembly 292 includes a first support plate 294 disposed over the cover member 288. Additionally, the assembly 292 includes a plurality of cross members, ribs, and/or stiffeners 296. Additionally, the stiffeners 296 and/or other components are configured to provide a connection to the lower end of the output member 290. For example, but without limitation, where the output member 290 is a hydraulic cylinder piston shaft with an aperture at its end, the members 296 can be configured to provide a "rodeye" connection. In an exemplary embodiment, where the press assembly 10 is a one-ton press, a rodeye pin with an 1½-inch diameter can be disposed in the aperture in the output member 290 and an appropriate clevis arrangement made from 3-inch thick bar and ½-inch thick plate material can be used to provide the appropriate connection between the output member 290 and the arrangement 292.

Figure 12:
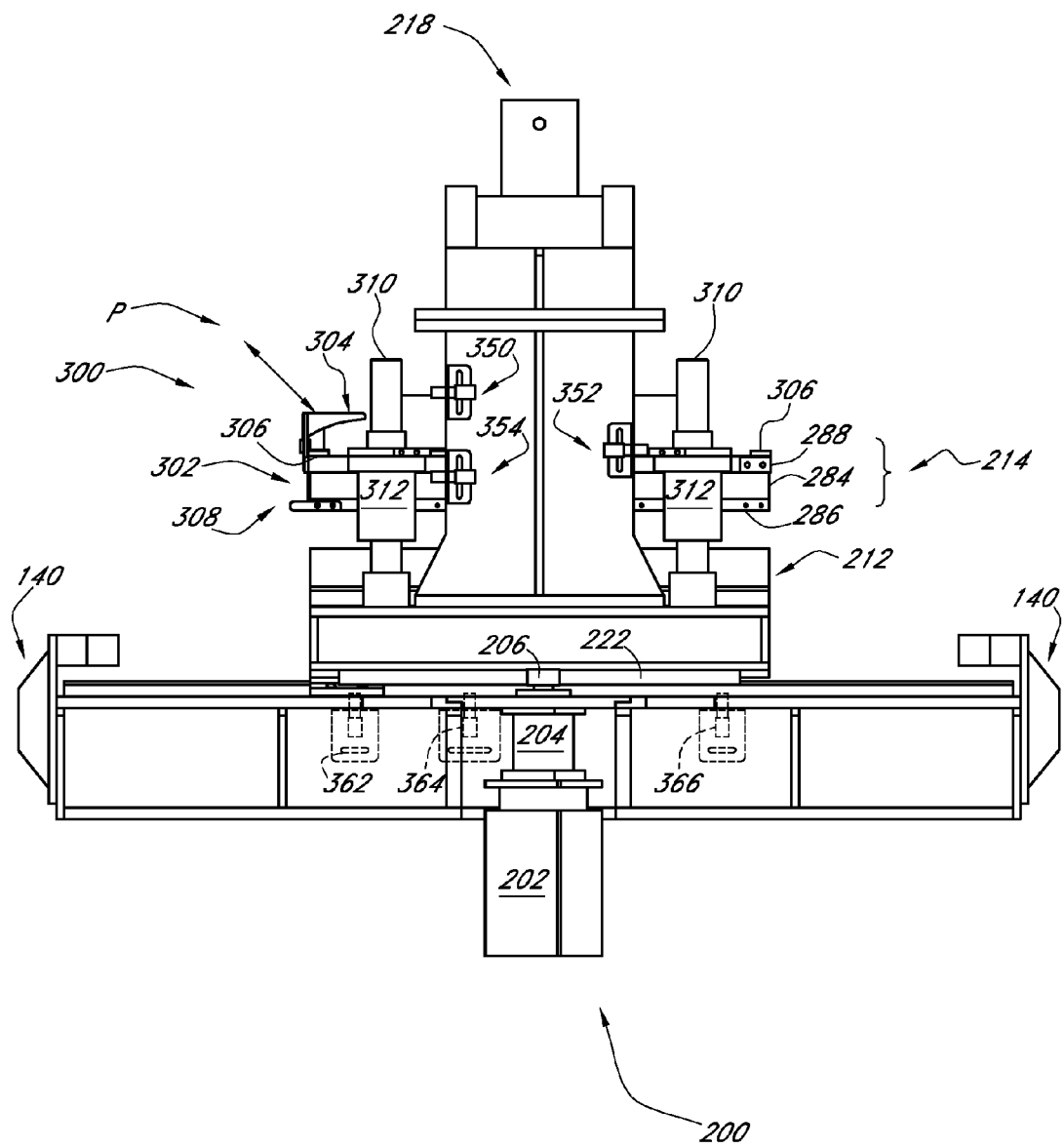
FIG. 12 is a left side elevational view of the reciprocating press assembly illustrated in FIG. 11.

With reference to FIG. 12, at least one releasable lock and preferably a plurality of releasable locks 300 (only one is illustrated), are provided for securing the die plate 286 to the heated portion 284. The locks 300 can be any type of lock. In illustrated arrangement, the lock 330 includes a connector member 302 and rotatable handle 304.

At its lower end, the connector member 302 can include an aperture for receiving a boss (not shown) extending from the die plate 286. At its upper end, the connector plate 302 is connected to a portion of the rotatable handle 304. Preferably, a base member 306 is provided beneath the handle 304 of the lock 300. The base 306 provides a further reinforcement for the cover member 288 in the vicinity of the lock 300.

As illustrated in FIG. 12, the rotatable handle 304 is pivotable in the direction of arrow P. The connection between the connection plate 302 and the handle 304 is configure such that when the handle 304 is rotated toward the transverse press 218, tension is applied to the connector 302, thereby securing the die plate 286 against the heated portion 284. Additionally, when the handle 304 is rotated in an opposite direction, the die plate 286 is released from the heated portion 284. Preferably, the connection between the connector plate and the handle 304 is an over-center arrangement such that when the handle 304 is rotated to the locked position, the over-centered geometry locks the handle 304 in the locked positioned.

A further advantage is provided where the locks 300 are arranged such that the handles 304 point inwardly toward the transverse drive 218 in the locked position. This provides further assurance that the handles 304 will not catch on cables, wires, or other devices that may be in the vanity of the press assembly 100.

Figure 13:
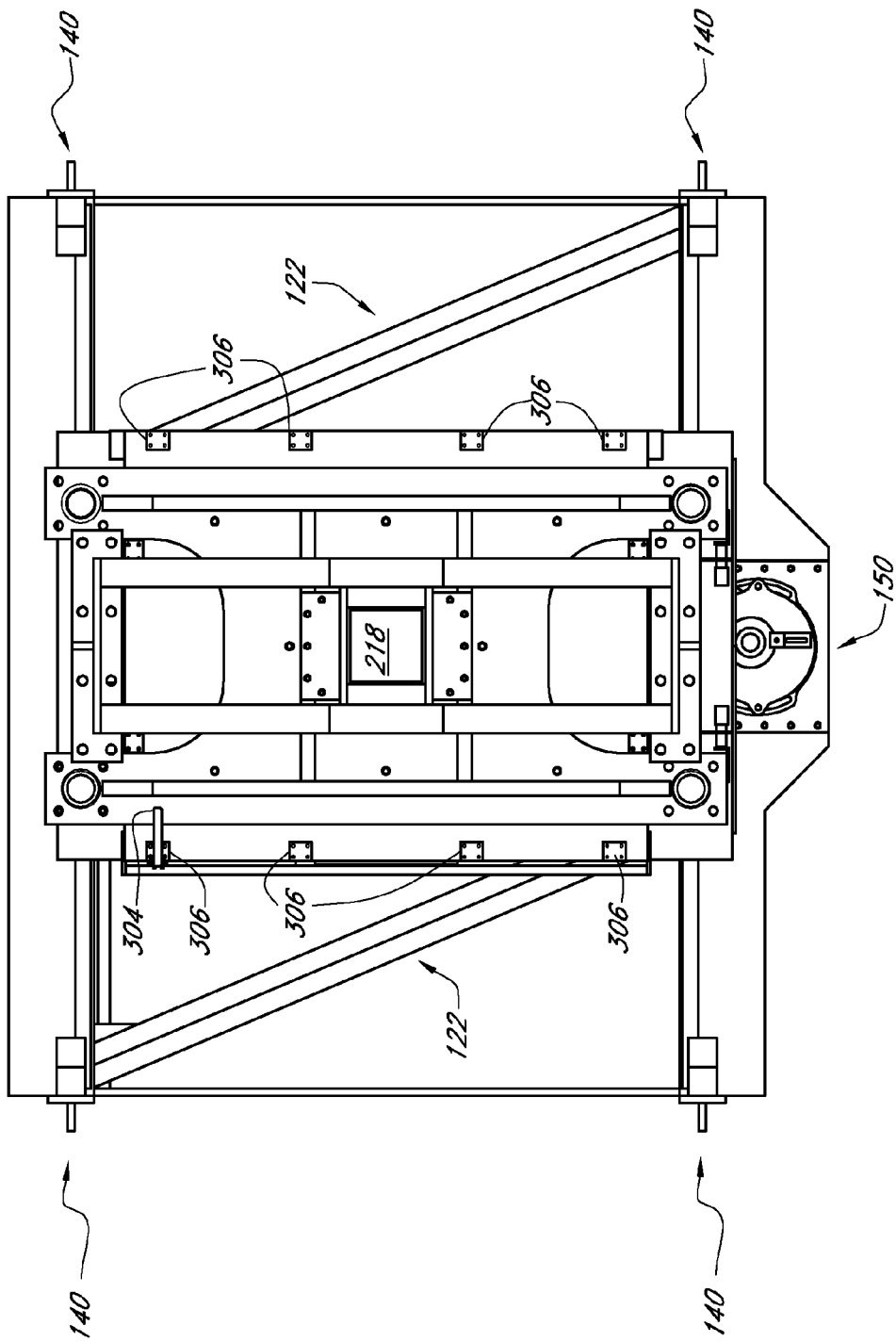
FIG. 13 is a top plan view of the reciprocating press assembly illustrated in FIG. 11.
Figure 14:
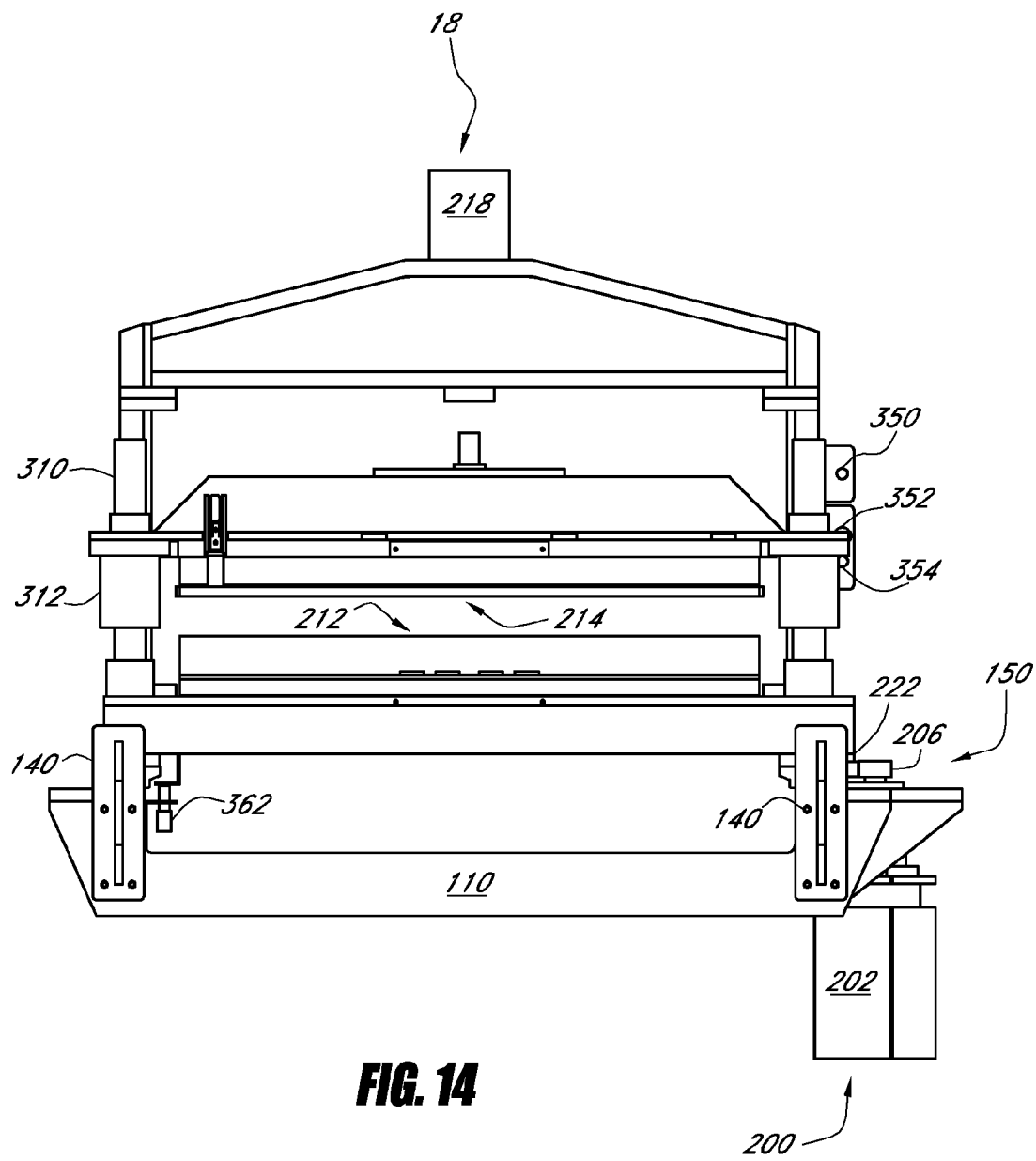
FIG. 14 is a front elevational view of the reciprocating press assembly illustrated in FIG. 11.

Yet another advantage is provided where the handles 304 are colored with a color that provides a contrast to the other colors of the assembly 102. For example, where the handles 304 are colored with a contrasting color, it is more easily verifiable by visual inspection that all the handles 304 are in their locked positions. In an exemplary, but non-limiting embodiment, the handles 304 can be red. Thus, where a plurality of locks 300 are provided around a periphery of the upper platen assembly 214, it is more easily verifiable by visual inspection that all the handles 304 are in their locked positions. FIG. 13 illustrates preferred positions of additional locks 300, represented by the illustration of additional bases 306.

Preferably, the die plate 286 also includes a handle 308 so as to further facilitate removable of the die plate from the rest of the upper platen assembly 214. The handle 308 can be provided at both the forward and rearward ends of the die plate 286; however, only one is illustrated in FIG. 12.

With reference again to FIG. 6, the transverse guide assembly 216 includes at least one vertical guide member 310 and at least one transverse guide follower 312 connected to the upper platen assembly 214. The guide member 310 and follower 312 are configured to ensure the desired vertical alignment and motion of the upper platen assembly 214 relative to the lower platen assembly 212.

In the illustrated embodiment, there is one transverse guide member 310 disposed in the vicinity of each corner of the upper platen assembly 214. In an illustrative, but non-limiting example, the transverse guide members 310 are cylinder-shaped members.

At least one end of the transverse guides 310 are connected so as to be stationary relative to the lower platen assembly 212. In the illustrated embodiment, the lower ends 314 of the transverse guides 310 are connected to the base member 230. Preferably, a connector 316 provides a connection between the base 230 and the lower end 314 of each guide 310. In the illustrated embodiment, the connector 316 can be a collar welded to the base 230 and to the lower end 314.

Upper ends 318 of the guides 310 can also be secured relative to the lower platen assembly 212. However, an advantage is provided by leaving the upper ends 318 disconnected. For example, by eliminating a connection of the upper ends 318 of the guides 310, the upper platen assembly 214 can be more easily removed from the guides 310.

The followers 312 are configured to provide a close fitting, but low friction engagement with the guides 310. In the illustrated embodiment, the guides 310 have a round outer surface. Thus, the followers 312 include a round inner surface for engaging the guide 310. In an illustrative, but non-limiting example, the guides 310 can be formed from 2-inch diameter stainless steel rod.

Figure 16:
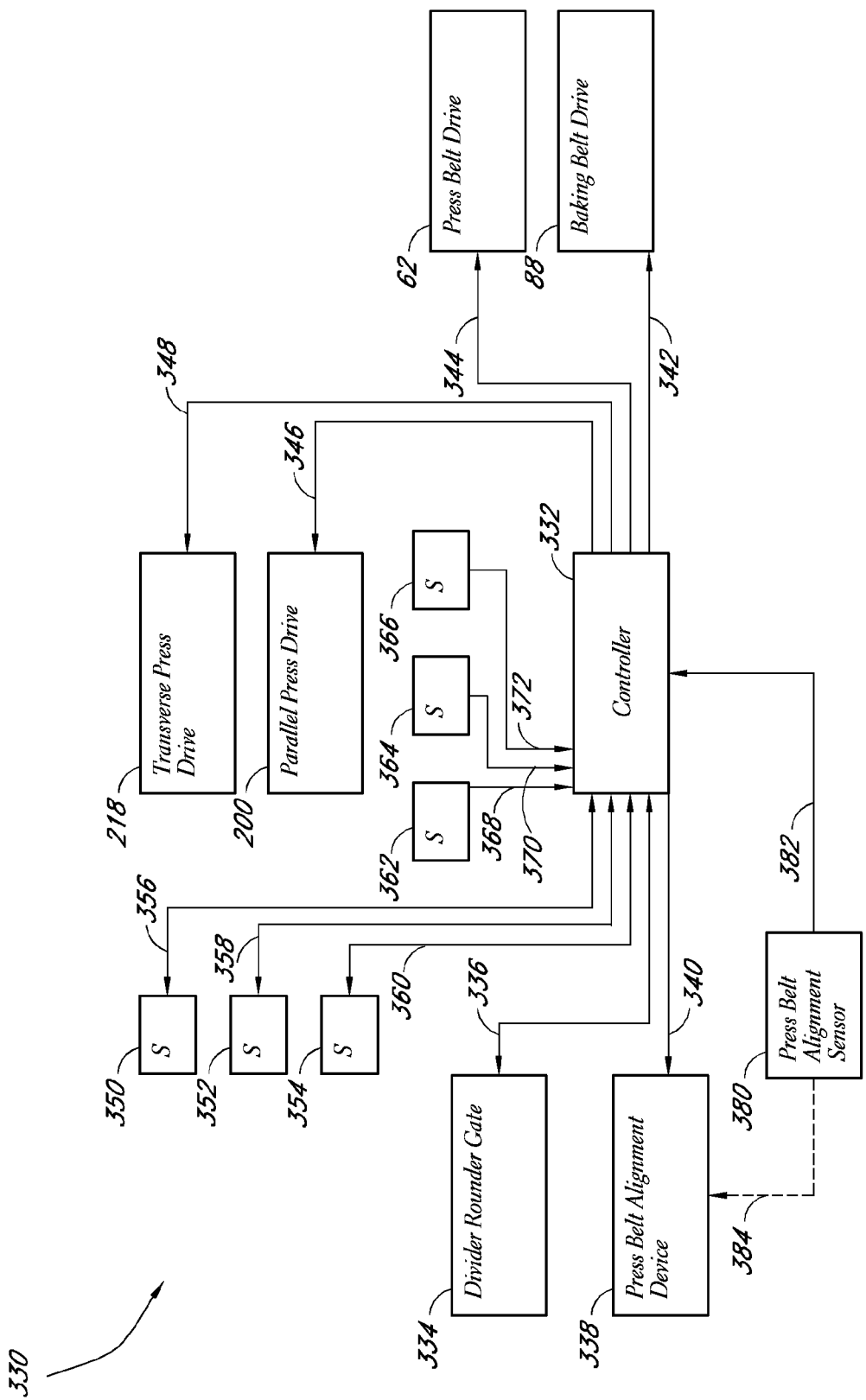
FIG. 16 is a schematic illustration of the press system illustrated in FIG. 1.

With reference to FIG. 16, the press system 10 also includes a control system 330. The control system 330 can be configured to control various operations of the devices within the press system 10.

The control system 330 includes at least one controller 332. The controller 332 can be formed with one or a plurality of hard-wired modules, one or a plurality of dedicated processors performing control routings, one or a plurality of general purpose processors running one or a plurality of control routines, or any combination of the above three noted types of controllers. For ease of description, the controller 332 is illustrated as a single component. However, the controller 332 can be divided into a number of discreet components, disposed at different locations. In an illustrative but non-limiting example, the controller can include a commercially available controller known as an MMC-A2 controller from Giddings & Lewis Controls.

As shown in FIG. 16, the controller 332 can be connected to a divider-rounder gate 334 by a gate control line 336. As noted above, the divider-rounder gate 334 can be in the form of any type of electronically controllable actuator. For example, but without limitation, the divider-rounder gate 334 can be controlled by a solenoid, servomotor, stepper mover, stepper solenoid or any other type of linear or rotational actuator.

The controller 332 is also connected to a press belt alignment device 338 by an alignment control line 340. The press belt alignment device 338 can be configured to provide adjustments to the lateral alignment of the conveyer belt 66. For example, the press belt alignment device can be configured to adjust, in a lateral direction, transverse to the direction of the belt 66, any one of the rollers 50, 52, 54, 58, 70, and 72. Additionally the press belt alignment device 338 can be any type of actuator, such as the actuators noted above with reference to the divider-rounder gate 334. Such an alignment device is commercially available as a 2006 HDSM TRUE TRACKER, from Eckels Bilt, of Forth Worth, Tex.

The controller 332 is also connected to the discharge drive 88 through a belt control line 342. As such, the controller can provide a control signal to the drive 88 through the control line 342.

The controller 332 is also connected to the press belt drive motor 62 through a press belt line 34. Thus, the controller 332 can control the actuation of the press drive motor 62.

The controller 332 is also connected to the parallel press drive 200 through a parallel press control line 346. Thus, the controller can control actuation of the parallel press drive 200 through the control line 346.

The controller 332 is also connected to the transverse press drive 218 through a control line 348. Thus, the controller 332 can control actuation of the transverse drive 218 through a control line 348. The control line 348 can comprise a plurality of control lines respectively connected to a plurality of control valves for the transverse press drive 218. For example, as is common with hydraulic actuators, there are a number of valves for controlling the flow of fluid to and from the hydraulic cylinder within the drive 218. Each of the valves can be individually controlled with individual actuators (not shown). Preferably, star-type valves are used for controlling the hydraulic cylinders, so as to reduce shock and vibration generated by the transverse drive 218.

The controller 332 can be pre-wired or programmed to control operation of the divider-rounder gate 334, the baking belt drive 342, the press belt drive 344, the parallel press drive 200, and the transverse press drive 218 in accordance with a predetermined timing schedule. For example, the controller can be configured to operate the press drive belt 62, the baking belt drive 90 at a predetermined speed. Additionally, the controller 332 can be configured to trigger the divider-rounder gate 334 to release the plurality of dough pieces onto the conveyor belt 66. Then, after a predetermined delay, the controller 332 can cause the parallel press drive 200 to move the press 102 parallel to the direction of travel of the upper surface of the conveyor belt 66 and substantially at the same speed thereof, i.e., the press 102 can be driven at a speed slightly greater than or slightly less than the speed of the upper surface of the conveyor belt 66. However, the press 102 preferably is driven at a speed as close as possible to the speed of the upper surface of the conveyor belt 66.

Additionally, the controller 332 can cause the transverse press to drive the upper platen assembly 214 downwardly into pressing engagement with the dough pieces on the conveyor belt 66 and the lower platen assembly 212. Preferably, when the upper platen assembly 214 is being pressed against the dough pieces, the conveyor belt 66, and the lower platen assembly 212, the upper platen 214 remains in pressing engagement at a predetermined pressure or at a predetermined spacing from the lower platen assembly 212 for a predetermined time. This predetermined time can also be referred to as a "dwell time".

Thereafter, the controller 332 can cause the transverse press drive 218 to raise the upper platen assembly 214 to a height above the unpressed dough pieces on the conveyor belt 66. After the upper platen assembly 214 is raised to the desired spacing, the controller 332 can trigger the parallel press drive 200 to reverse direction and move the press assembly 102 in a direction opposite to the travel of the upper surface of the conveyor belt 66 so as to return the press assembly 102 back to its initial position.

The control system 330 preferably includes a plurality of sensors for providing reference and/or feedback information to the controller 332. For example, the controller 332 can receive detection signals from position sensors which provide reference data to the controller 332. In the illustrated embodiment, the control system 330 includes several position sensors 350, 352, and 354 configured to detect a position of the upper platen assembly 214 and to generate a signal indicative thereof. The position sensors 350, 352, 354 are connected to the controller 332 by sensor lines 356, 358 and 360, respectively.

In the illustrated embodiment, two of the position sensors 350, 354 are provided as limit sensors. As such, if the controller 332 receives a signal from either the limit sensors 350, 354, the controller 332 will stop the transverse press drive 218.

One of the position sensors 354, in another arrangement, can be positioned at a reference spacing between the upper and lower platen assemblies 214, 212. For example, the sensor 354 can be positioned such that when the upper platen assembly 214 drops to a position which triggers the sensor 354, a timer (not shown) is triggered within the controller 332. Additionally, the controller 332 can be configured to maintain the upper platen assembly 214 in the lower position for a predetermined period of time from the moment at which the sensor 354 is triggered. Thus, the sensor 354 provides a trigger for a "dwell timer" which determines the amount of time that the upper platen assembly 214 should be maintained in a lowered position.

The sensor 352 can be configured to provide a reference signal to the controller 332 for determining when the upper platen assembly 214 is at the appropriate spacing from the lower platen assembly 212 to allow the press assembly 102 to be moved upstream along the direction of travel of the conveyor belt 66 back to an initial starting position. For example, where the press system 10 is configured to press balls of dough having a diameter of less than two inches, the sensor 352 can be configured to output a signal to the controller 332 when the upper platen assembly 214 is adequately spaced from the lower platen assembly at a distance greater than two inches. As such, the sensor 352 indicates to the controller 332 that the upper platen assembly 214 is adequately spaced from the lower platen assembly 212, and that the press assembly 102 can be moved back to an initial position. Of course, this is one example of a type of sensor arrangement that can be used for detecting the position of the upper platen assembly 214. Other types of sensors and sensors arrangements can be used. For example, but without limitation, a single proportional sensor can replace the sensors 350, 352, 354. For example, such a sensor could be formed from any type of known linear transducer.

The control system 330 also preferably includes at least one sensor for determining the position of the press assembly 102 relative to the parallel guide support 100. In the illustrated embodiment, the control system 330 includes sensors 362, 364, and 366 configured to detect a position of the press assembly 102 relative to the parallel guide support 100. The sensors 362, 364, 366 are connected to the controller 332 by sensor lines 368, 370, and 372, respectively.

With reference to FIG. 7, the sensors 362, 364, 366 preferably are mounted to the parallel guide support 100. In the illustrated embodiment, the sensors 362 and 366 are arranged and configured to provide service limit signals to the controller 332. For example, the sensors 362 and 366 are configured and positioned to emit a signal indicating that the press assembly 102 has moved beyond the desired extreme forward and rearward positions of the press assembly 102 along the parallel guide support 100. The controller 332 can be configured to immediately stop operation of the drive 200 if such a signal from either of the sensors 362, 366 is received. Optionally, the sensors 326, 366 can be omitted.

Preferably, the sensor 364 is configured and arranged to provide a reference position signal to the controller 332. The position corresponding to the transmission of the reference position signal to the controller 332 can be any position of the assembly 102 along the parallel guide support 100 that is within the normal desired operating positions during operation of the system 10. This reference position can be used by the controller 332 to confirm a position of the assembly 102 relative to the parallel guide support 100. As such, the controller 332 can maintain the desired synchronization of the parallel movement of the assembly 102 and the transverse movement of the upper platen assembly 214 with the movement of the conveyor belt 66 and along with dough pieces transported thereby.

As noted above, the sensors 362, 364 and 366 can be replaced with a single position sensor. For example, a single proportional linear transducer can be used to replace the sensors 362, 364, 366.

In an illustrative, but non-limiting example, the sensors 350, 352, 354, 362, 364, 366, are optical sensors mounted with an adjustable mount. Although such optical sensors do not provide proportional output, they are inexpensive and reduce the number of moving of moving parts of the system 10.

Additionally, the control system 330 can include a press belt alignment sensor 380 connected to the controller 332 by a press belt alignment sensor line 382. As such, the controller 332 can use signals from the sensor 380 to control the alignment device 338. The press belt alignment sensor 380 also can be directly connected to the alignment device 338 through a line 384. As such, the alignment device 338 can operate with the controller 332 as independently from the controller 332 as a standalone system.

Figure 17:
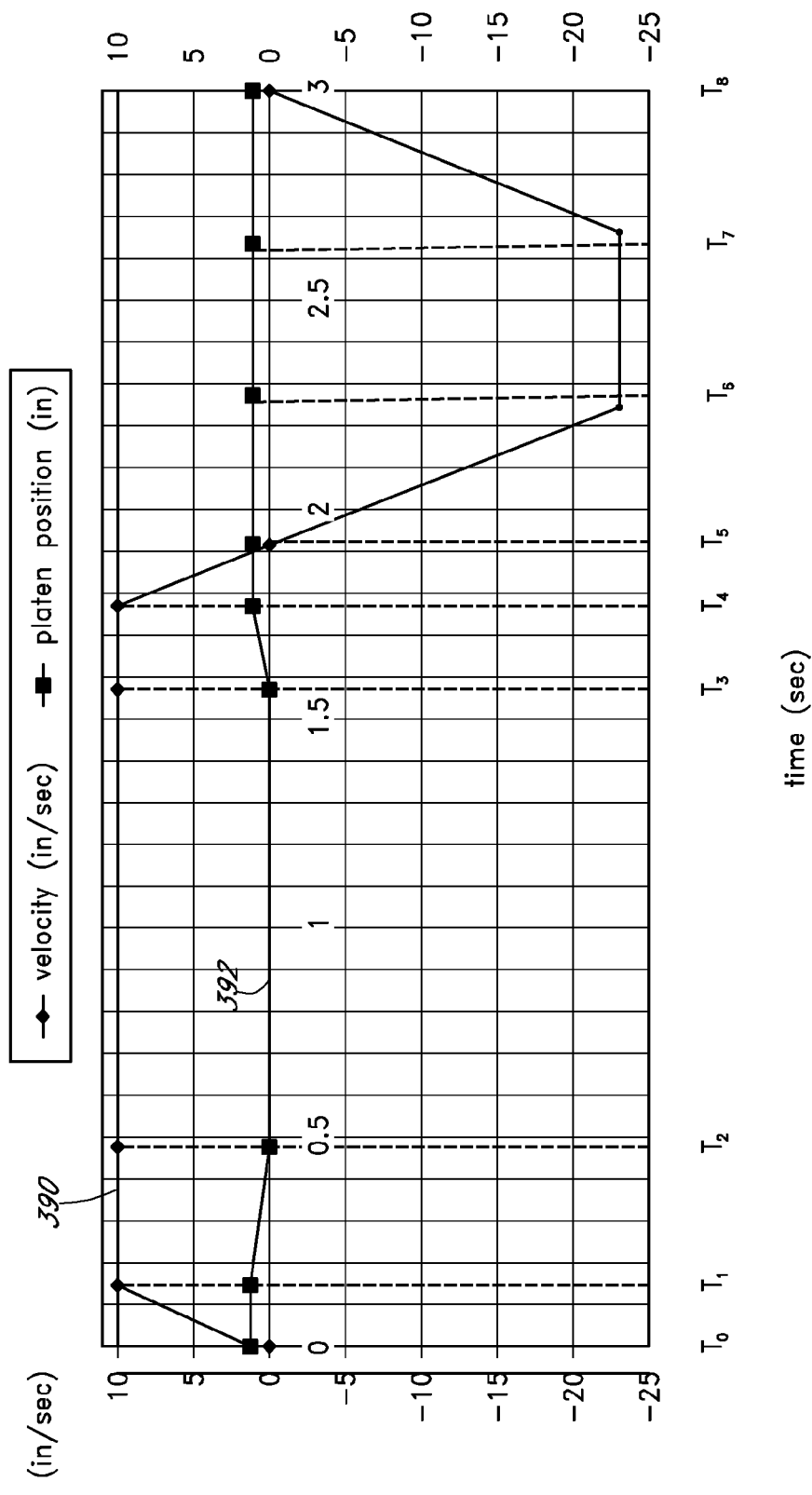
FIG. 17 is a plot with the horizontal axis representing time and two curves, one curve representing a velocity of the reciprocating portion of the press, and the second curve representing the position of the upper platen.

With reference to FIG. 17, the controller 332 can be programmed to control the parallel drive 200 and the transverse drive 218 in accordance with a predetermined cycle, an exemplary embodiment of which is illustrated in FIG. 17. In FIG. 17, a curve 390 represents a velocity of the assembly 102 in a direction parallel to the direction of travel of the conveyor belt 66. A curve 392 represents a position of the upper platen assembly 214. A horizontal axis of the graph of FIG. 17 represents time. With respect to the curve 390, the vertical axis represents inches per second. With respect to the curve 392, the vertical axis represents inches. Positions of the platen assemblies 212, 214 at certain times during the cycle are schematically represented in FIG. 18.

An initial time $T_0$ of the cycle illustrated in FIG. 17 corresponds to a moment at which one or a plurality of dough pieces $D_2$ are moved into a position between the lower and upper platens 212, 214 on an upper surface of the conveyor belt 66. At the time $T_0$ the controller 332 signals the parallel drive 200 to accelerate the assembly 102 to the same speed of the upper surface of the conveyor belt 66.

At the time $T_1$, the assembly 102 has been accelerated to the same speed as the conveyor belt 66. Additionally, the time $T_0$ is chosen such that by the time $T_1$, the dough pieces $D_2$ are aligned in the desired orientation between the platens 212, 214.

At the time $T_1$, the controller 332 begins to drive the transverse press 218 downwardly, and preferably, at a predetermined pressure. The upper platen assembly 214 reaches the lower most position at time $T_2$.

The time $T_2$ corresponds to a time that after the controller 332 receives a signal from the sensor 354 indicating that the platen 214 has reached a lower position. Between the times $T_2$ and $T_3$, the upper platen 214 is held in a lowermost position at a predetermined pressure applied by the transverse drive 218. In an exemplary but non-limiting embodiment, the time over which the upper platen 214 is held in the lowermost position is about 1 second.

At the time $T_3$, the controller 332 triggers the transverse drive 218 to begin raising the upper platen assembly 214 to at least a position above the height of unpressed dough pieces $D_3$ traveling on the conveyor belt 66. Preferably, the upper platen 214 is moved to a position not more than one-inch above the tops of the next group of dough balls $D_3$.

The time $T_4$ corresponds to a time at which the controller 332 receives a signal from the sensor 352 indicating that the upper platen 214 has been raised to the desired height. At time $T_4$, the controller 332 triggers the parallel drive 200 to accelerate the assembly 102 in the opposite direction, preferably at the maximum acceleration and speed practicable in order to return the assembly 102 to the position corresponding to $T_0$.

The time $T_5$ corresponds to the moment at which the assembly 102 stops and reverses direction. The time $T_6$ corresponds to the time at which the assembly 102 reaches a maximum velocity toward the initial position.

At time $T_7$, the controller 332 signals the parallel drive 200 to slow the assembly 102 as it approaches the initial position. The parallel drive 200 slows the assembly 102 until it reaches time $T_8$, at which time the assembly 102 stops at the initial position, ready to start the next cycle.

Of course, the foregoing description is that of a preferred construction having certain features, aspects, and advantages in accordance with the inventions disclosed herein. Other embodiments of the inventions disclosed herein are apparent to those of ordinarily skill in the art in view of the disclosure set forth herein. Furthermore, those skilled in the art will recognize the interchangeability of various features of the embodiments of the press system. Accordingly, the inventions are not intended to be limited by the specific disclosure of the preferred embodiment set forth above.

The invention claimed is:

1. A tortilla manufacturing system comprising:
   a conveyor belt configured to transport dough pieces linearly along a portion of a tortilla manufacturing line, the conveyor belt defining a circumferential periphery;
   an upper platen including a lower pressing surface configured and sized to press a plurality of dough pieces into tortilla shapes;
   a lower platen including an upper pressing surface configured to support the conveyor belt and dough pieces against the lower surface of the upper platen;
   a press assembly mounted adjacent the conveyor belt and supporting the upper and lower platens, the conveyor belt passing between the upper and lower platens such that the lower platen is encircled within the circumferential periphery defined by the conveyor belt, the press assembly also including a rack gear disposed on a lateral side of the press assembly;
   a press assembly support comprising a plurality of guides configured to support the press assembly and to allow the press assembly to reciprocate along a path parallel to a movement of the conveyor belt;
   a vertical drive system including a hydraulic ram configured to move the upper platen downwardly relative to the lower platen with sufficient force to flatten dough pieces into tortilla shapes;
   a parallel drive system configured to move the press assembly support and the upper and lower platens of the press assembly supported by the press assembly support in a direction parallel to a movement of the conveyor belt, the parallel drive system comprising a servomotor assembly and a drive gear mounted on an output shaft of the servomotor assembly, the drive gear being positioned so as to mesh with the rack gear, said drive gear and rack gear being configured to move the press assembly and the press assembly support in a direction parallel to a movement of the conveyor belt when the output shaft of the servomotor assembly rotates;
   a controller configured to control the parallel and vertical drives such that the upper platen is pressed against the conveyor belt and at the same time, the press assembly is moved at the same speed and in the same direction as the conveyor belt; and
   a support frame for supporting the press assembly;
   wherein the drive gear comprises a pinion gear;
   wherein the servomotor assembly and the drive gear are coupled to the press assembly support such that the servomotor assembly and the drive gear remain stationary relative to the support frame and do not move together with the press assembly while the system is in use;
   wherein, when in operation, the servomotor assembly moves the press assembly support and the upper and lower platens relative to the servomotor assembly and relative to the support frame, wherein the servomotor assembly, when in use, moves the upper and lower platens and the press assembly in unison relative to the support frame, such that the upper and lower pressing surfaces of the platens can be moved relative to one another irrespective of an operational status of the servomotor assembly; and
   wherein the servomotor assembly is positioned on the system such that the servomotor assembly is easily accessible by a user.

2. The system according to claim 1, wherein the servomotor is disposed outside of the circumferential periphery of the conveyor belt.

3. The system according to claim 1, wherein the rack gear is disposed completely outside of the circumferential periphery defined by the conveyor belt.

4. The system according to claim 1, wherein the lower platen includes a heating element.

5. The system according to claim 1, wherein the upper platen includes a heating element.

6. The system according to claim 1, wherein the controller is configured to instruct the press drive to raise the upper platen above the conveyor belt to a return height that is not more than 1 inch higher than the tallest dough piece being fed to the press.

7. The system according to claim 6, wherein the controller is configured to instruct the parallel drive to stop and to reverse movement of the press assembly relative to the conveyor belt only after the upper platen has been raised to the return height.

8. The system according to claim 1 additionally comprising a heater member in contact with at least one of the upper and lower platens, the heater member being removable and including a channel configured to receive an electric heater element.

9. The system according to claim 1, wherein the press assembly comprises a frame and a plurality of releasable clamps configured to lock the upper platen relative to the frame.

10. A press comprising:
a conveyor configured to transport articles along a transport direction;
a first platen;
a second platen, wherein at least one of the first and second platens are configured to be moveable in a pressing direction transverse to the transport direction;
a press assembly supporting the first and second platens, the conveyor passing between the first and second platens;
a transverse drive configured to move at least one of the first and second platens into a pressing relationship;
a parallel guide along which the press assembly reciprocates in directions parallel to the transport direction;
a parallel drive coupled with the press assembly to move the press assembly parallel to the transport direction, the parallel drive comprising an output shaft, a pinion gear mounted to the output shaft, and a rack gear mounted on the press assembly, said rack gear being configured to generally mesh with the pinion gear; and
a support frame for supporting the press assembly;
wherein the pinion gear is configured to move relative to the rack gear when the output shaft rotates;
wherein the press assembly is configured to move in a direction parallel to the transport direction when the pinion gear moves relative to the rack gear;
wherein the parallel drive comprises an electric servomotor driving the output shaft for moving both the first and second platens of the press assembly in a direction parallel to the transport direction;
wherein the electric servomotor is coupled to a press assembly support, said press assembly support positioned below the press assembly and supporting the press assembly to allow the press assembly to be moved along the transport direction, in a reciprocating manner, relative to the press assembly support, wherein said press assembly support is generally stationary;
wherein the electric servomotor remains stationary relative to the support frame and does not move together with the press assembly while the press is in use;
wherein, when in operation, the electric servomotor moves the press assembly relative to the electric servomotor and relative to the support frame and moves the first and second platens and the press assembly, as one, relative to the support frame, such that the platens can be moved relative to one another in a vertical direction irrespective of an operational status of the electric servomotor; and
wherein the electric servomotor is positioned on the press such that the electric servomotor is easily accessible by a user.

11. The press according to claim 10, wherein the transverse drive is supported by the press assembly.

12. The press according to claim 10, wherein electric servomotor is positioned along a lateral edge of the press assembly.

13. The press according to claim 10 additionally comprising a controller configured to control the parallel and transverse drives such that the platens are pressed toward each other and, at the same time, the press assembly is moved substantially at a same speed as the conveyor.

14. The press according to claim 10, wherein the parallel drive comprises an electric motor and a gear reduction device, and the output shaft extends from the gear reduction device.

15. The press according to claim 14 additionally comprising a movable alignment plate supporting the electric motor and the gear reduction device.

16. The press according to claim 15, wherein the movable alignment plate is rotatable about a first axis.

17. The press according to claim 16, wherein the output shaft is mounted to the alignment plate such that the rotatable axis of the output shaft is offset from the first axis.

18. The press according to claim 10, wherein the rack gear is mounted to the press assembly so as to reciprocate with the press assembly.

19. A press comprising:
a conveyor configured to transport articles along a transport direction;
a press assembly supporting first and second press members, said press assembly comprising a rack gear;
a support frame for supporting the press assembly;
a parallel drive comprising an output shaft configured to rotate about an output shaft axis and configured to move the press assembly parallel to the transport direction, wherein said output shaft axis is connected to a pinion gear, the pinion gear being configured to generally mate with the rack gear; and
an alignment assembly comprising a support member configured to rotate about an alignment axis, the support member configured to support the drive such that the output shaft axis is offset from the alignment axis;
a selectively adjustable spacing between the pinion gear and the rack gear; said spacing controlling if and to what extent the pinion gear mates with the rack gear;
wherein rotation of the support member about the alignment axis, when the press is not in operation, selectively adjusts the spacing between the pinion gear and the rack gear; and
wherein the parallel drive is attached to a press assembly support, said press assembly support positioned below the press assembly and supporting the press assembly to allow the press assembly to be moved along the transport direction;
wherein the parallel drive remains stationary while the press is in use; and
wherein, when in operation, the parallel drive moves the press assembly relative to the support frame and moves both the first and second press members of the press assembly in unison relative to the support frame, such that the press members can be moved relative to one another irrespective of the location of the press assembly relative to the support frame.

20. The press according to claim 19 additionally comprising fasteners configured to anchor the support member so as to resist rotation of the support member relative to the press assembly.

21. The press according to claim 19, wherein the parallel drive comprises an electric motor in the gear reduction device, and the output shaft extends from the gear reduction device.

22. The press according to claim 21, wherein the support member supports an entire weight of the electric motor and the gear reduction device.

23. The press according to claim 19, wherein the support member comprises a first central aperture configured to receive the output shaft and at least one anchoring aperture.

24. The press according to claim 23, wherein the at least one anchoring aperture is positioned along a first radius having a center coincident with an alignment axis.

25. The press according to claim 24, wherein the first radius is greater than the offset.

26. The press according to claim 19, wherein the alignment assembly comprises an alignment guide configured to guide the support member rotationally about the alignment axis.

27. The press according to claim 26, wherein the alignment guide comprises at least one arcuate slot having a first radius of curvature with a center coincident with the alignment axis.

28. The press according to claim 27, wherein the support member comprises at least one anchoring aperture disposed along the first radius.

29. The press according to claim 28 additionally comprising a releasable fastener extending through the anchoring aperture and the arcuate slot.

30. A press comprising:
   a conveyor configured to transport articles along a transport direction;
   a press assembly supporting first and second press members;
   a support frame for supporting the press assembly;
   a parallel drive comprising a reversible electric servomotor unit with a rotating output shaft coupled to a rack and pinion system, said servomotor unit and rack and pinion system configured to move the press assembly in first and second directions that are parallel to the transport direction, without an additional device for converting the rotational movement of the output shaft into a reciprocating movement;
   wherein the electric servomotor unit moves the first and second press members of the press assembly together relative to the support frame, such that the press members can be moved relative to one another, toward and away from a pressing relationship, irrespective of the location of the press assembly relative to the support frame;
   wherein the servomotor unit is stationary relative to the support frame when the press is in use; and
   wherein the servomotor is positioned on the press such that the servomotor is easily accessible by a user.

* * * * *